Figure 1:
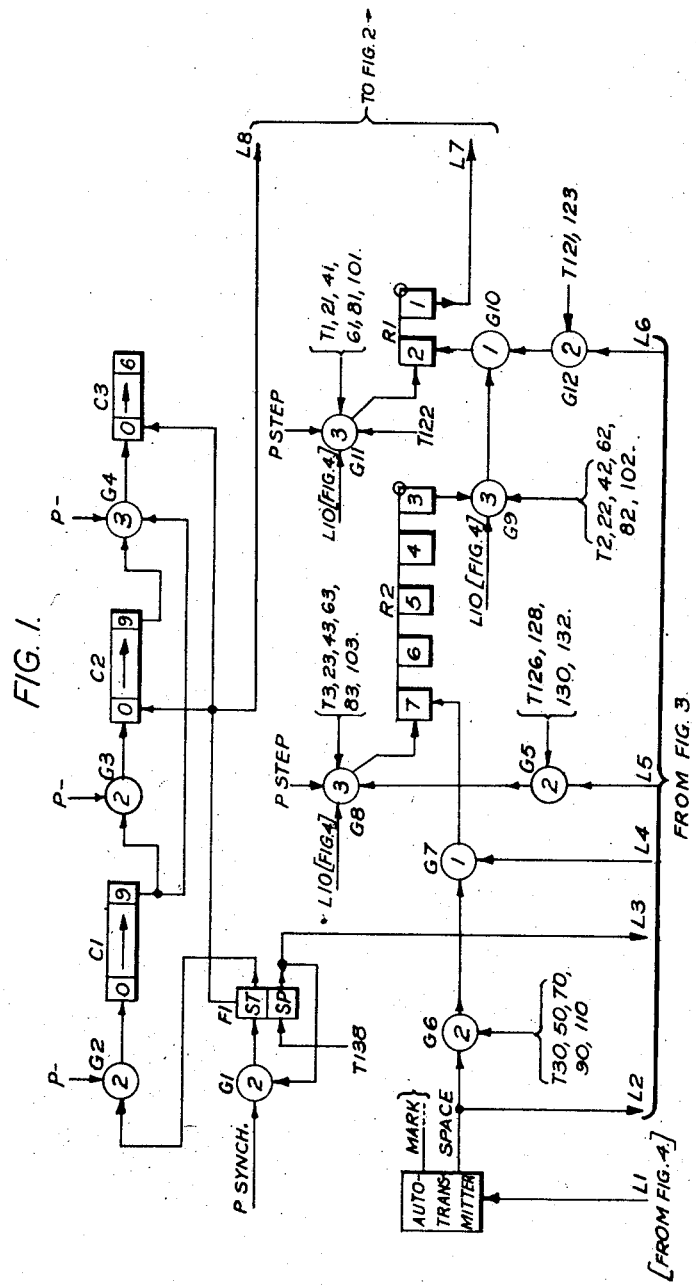

Sept. 29, 1953    E. P. G. WRIGHT    2,653,996
ELECTRIC TELEGRAPH SYSTEM
Filed Nov. 10, 1951    12 Sheets-Sheet 2

Inventor
E. P. G. Wright
By Robert Harding Jr.
Attorney

Sept. 29, 1953  E. P. G. WRIGHT  2,653,996
ELECTRIC TELEGRAPH SYSTEM
Filed Nov. 10, 1951  12 Sheets-Sheet 3

Inventor
E. P. G. Wright
By Robert Harding Jr.
Attorney

Sept. 29, 1953  E. P. G. WRIGHT  2,653,996
ELECTRIC TELEGRAPH SYSTEM
Filed Nov. 10, 1951  12 Sheets-Sheet 6

FIG. 7.

| COMBINATION | No. OF SPACES | PREFIX | TRANSLATION (IF ANY) |
|---|---|---|---|
| M M M M M | NONE | M S | [S] M M [S] M |
| S M M M M | | | |
| M S M M M | | | |
| M M S M M | ONE | S S | NONE |
| M M M S M | | | |
| M M M M S | | | |
| S S M M M | | | |
| S M S M M | | | |
| S M M S M | | | |
| S M M M S | | | |
| M S S M M | TWO | S M | NONE |
| M S M S M | | | |
| M S M M S | | | |
| M M S S M | | | |
| M M S M S | | | |
| M M M S S | | | |
| S S S M M | | | |
| S S M S M | | | |
| S S M M S | | | |
| S M S S M | | | |
| S M S M S | THREE | M M | NONE |
| S M M S S | | | |
| M S S S M | | | |
| M S S M S | | | |
| M S M S S | | | |
| M M S S S | | | |
| S S S S M | | | [M] S [M] S M |
| S S S M S | | | [M] S [M] M S |
| S S M S S | FOUR | M S | [M] S [S] [M] [M] |
| S M S S S | | | [M] M [M] S S |
| M S S S S | | | [S] S [M] [M] [M] |
| S S S S S | FIVE | M S | [M] [M] S S [M] |

Inventor
E. P. G. Wright
By Robert Harding Jr.
Attorney

Sept. 29, 1953  E. P. G. WRIGHT  2,653,996
ELECTRIC TELEGRAPH SYSTEM
Filed Nov. 10, 1951  12 Sheets-Sheet 7

FIG. 8.

FIRST COMBINATION:-

| TIME IN MILLISERS | CONDITION F2 | CONDITION OF F5 | CONDITION OF R4 |  |  |  |  |  |  |
|---|---|---|---|---|---|---|---|---|---|
|  |  |  | TUBE 1 | 2 | 3 | 4 | 5 | 6 | 7 |
| 0 | M | M | M | M | M | M | M | M | M |
| 20 | S |  |  |  |  |  |  |  |  |
| 29 |  |  | M | M | M | M | M | M | S |
| 48 | [S] |  | M | M | M | M | M | S | M |
| 49 |  |  | M | M | M | M | M | S | S |
| 60 | M |  |  |  |  |  |  |  |  |
| 68 |  |  | M | M | M | M | S | S | M |
| 88 | [M] |  | M | M | M | S | S | M | M |
| 100 | S |  |  |  |  |  |  |  |  |
| 108 |  |  | M | M | S | S | M | M | M |
| 109 |  |  | M | M | S | S | M | M | S |
| 120 | M |  |  |  |  |  |  |  |  |
| 128 |  |  | M | S | S | M | M | S | M |

SECOND COMBINATION:-

| 0 | S | M | M | S | S | M | M | S | M |
|---|---|---|---|---|---|---|---|---|---|
| 8 |  |  | S | S | M | M | S | M | M |
| 9 |  |  | S | S | M | M | S | M | S |
| 27 | [S] | S |  |  |  |  |  |  |  |
| 28 |  |  | S | M | M | S | M | S | M |
| 30 |  | M |  |  |  |  |  |  |  |
| 47 | [S] | S |  |  |  |  |  |  |  |
| 48 |  |  | M | M | S | M | S | M | M |
| 50 |  | M |  |  |  |  |  |  |  |
| 60 | M |  |  |  |  |  |  |  |  |
| 68 |  |  | M | S | M | S | M | M | M |
| 88 | [M] |  | S | M | S | M | M | M | M |
| 107 | [M] | S |  |  |  |  |  |  |  |
| 108 |  |  | M | S | M | M | M | M | M |
| 111 |  |  | M | S | M | M | M | M | S |
| 126 | [M] | M |  |  |  |  |  |  |  |
| 128 |  |  | S | M | M | M | M | S | M |
| 137 |  | S |  |  |  |  |  |  |  |

Inventor
E. P. G. Wright
By Robert Harding Jr.
Attorney

Sept. 29, 1953  E. P. G. WRIGHT  2,653,996
ELECTRIC TELEGRAPH SYSTEM
Filed Nov. 10, 1951  12 Sheets-Sheet 11

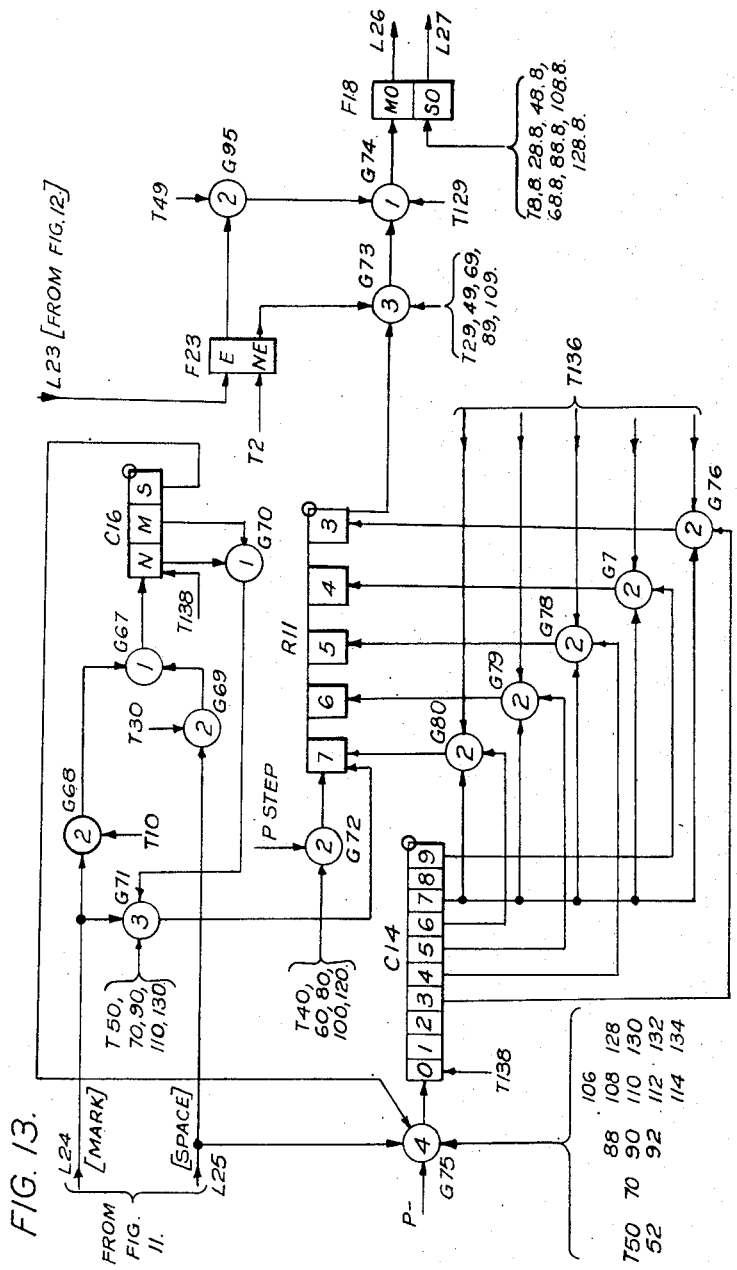

Patented Sept. 29, 1953

2,653,996

UNITED STATES PATENT OFFICE 2,653,996

ELECTRIC TELEGRAPH SYSTEM

Esmond Philip Goodwin Wright, London, England, assignor to International Standard Electric Corporation, New York, N. Y., a corporation of Delaware Application November 10, 1951, Serial No. 255,794
In Great Britain November 8, 1950

15 Claims. (Cl. 178—23)

This invention relates to electric telegraph systems and similar signalling systems using two signalling conditions, called in the case of telegraphy, mark and space respectively.

Telegraph systems are known in which the code combinations used are such that an incorrectly received combination can readily be detected and either a printed indication be made that a character is incorrect, or a request for repetition of the signal combination be automatically sent back to the transmitter.

A well known form of code for such a system is one in which the ratio of marks and spaces in each combination is always the same, for example, each character is represented by a code combination of eight elements, there being always four marks and four spaces. Alternatively, each character may be represented by a code combination of seven elements, there being always three marks and four spaces or vice versa in a combination.

Whilst the uses hitherto proposed for these codes have been to detect the presence of an error in a received code combination, it has been necessary, in all known systems, to send back from the receiving station to the transmitting station a request for the re-transmission of the characters that were received incorrectly, usually referred to as a "RQ" and then for the transmitting station to retransmit the characters. Clearly this means additional channel time and it is to be noted that it is necessary to take up considerable time to identify the particular characters for which re-transmission is required both in the "RQ" and in the retransmission.

The present invention provides a means, not only for indicating the presence of an error, but of identifying the nature of the error so that correction of the error can be made without the necessity for any "RQ."

According to the present invention, characters are divided into groups and after each group of $n$ code combinations an additional, cross-check combination is sent, the respective elements of which depend upon the relation between the numbers of marks and spaces in the corresponding elements of the code combinations of the preceding group.

The invention will be described in relation to the translation into and from a seven-element error-indicating code containing a constant total of three spaces and four marks.

The basic principles of the translation process may be summarised briefly as follows:

(a) A two-element prefix is added to the original five-element teleprinter code combination to bring the total number of elements up to seven.

(b) In the case of code combinations containing one, two or three spaces, the prefix adds the number of spaces necessary to bring the total number of spaces up to three, no further translation being effected.

(c) In the case of the remaining code combinations the prefix is invariable and distinct from those added in paragraph b and further translations are carried out on the original code combination before re-transmission.

These basic principles of translation are disclosed in U. S. Patent No. 2,520,142, issued to J. A. Herbst. In the circuits disclosed in this prior specification, electro-magnetic contact-making relays are used together with mechanical input and output distributors.

Figure 3:
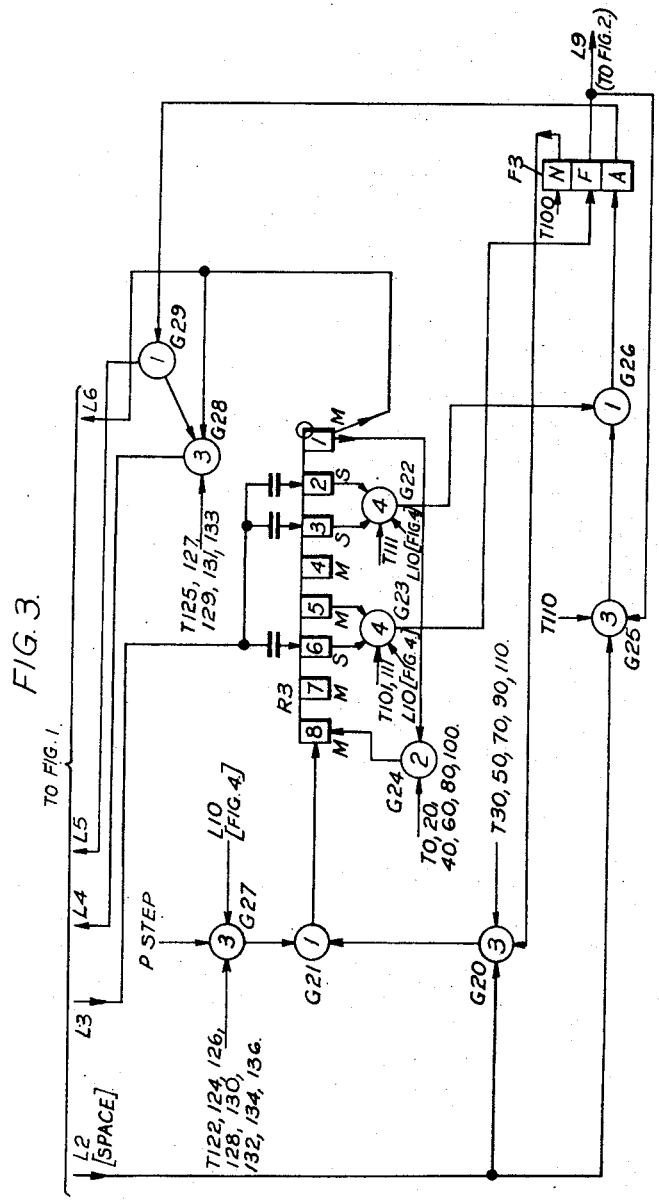
Figure 4:
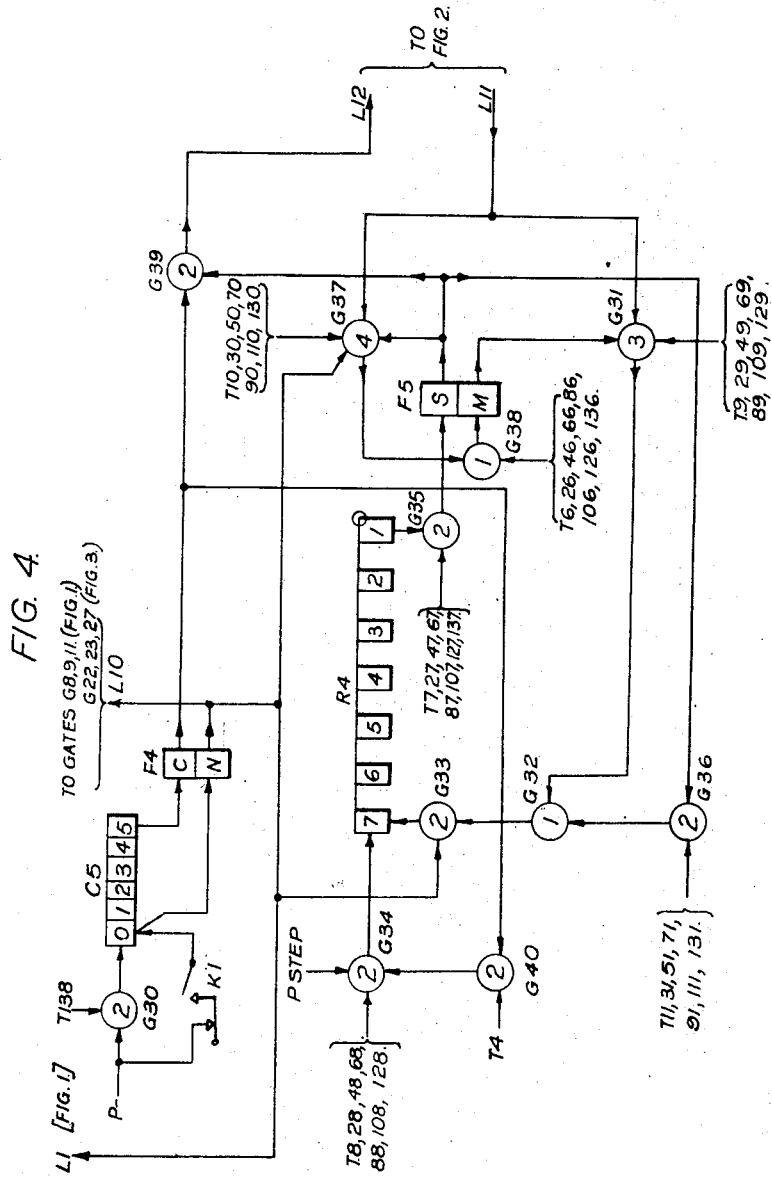
Figure 5:
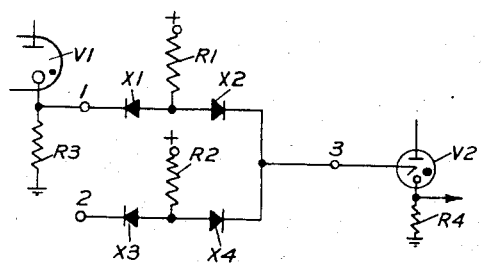
Figure 6:
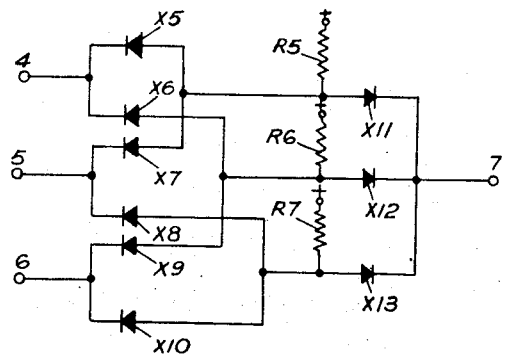
Figure 9:
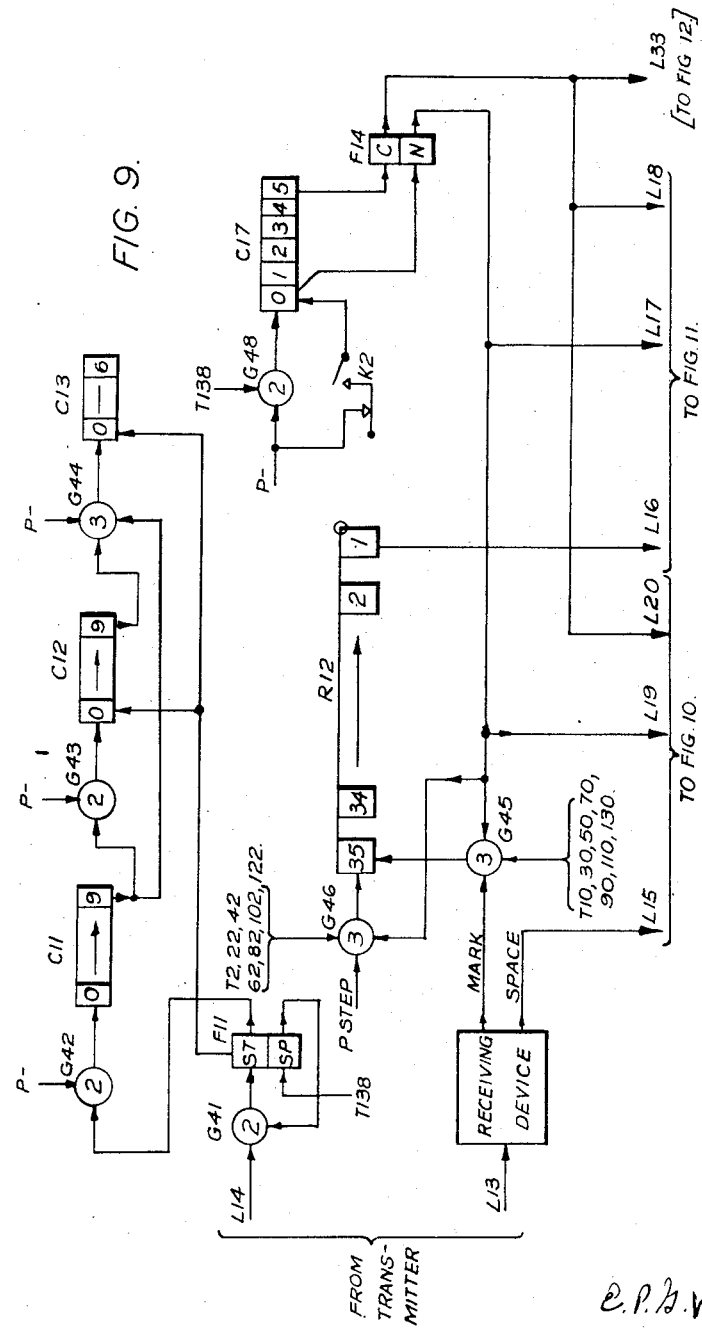

An embodiment of the invention will now be described with reference to the accompanying drawings in which:

Figs. 1 to 4 together form a block schematic diagram of a circuit according to the invention for translating five element start-stop teleprinter code combinations into constant-total seven-element combinations and for inserting a cross-check combination after every five combinations have been transmitted, Figs. 5 and 6 are diagrams showing in greater detail two of the devices shown symbolically in Figs. 1 to 4 and 9 to 12, Fig. 7 is a table showing the thirty-two five-element code combinations together with the seven-element code combinations into which and from which they are translated by means of the circuits of Figs. 1 to 4 and 9 to 13, Fig. 8 is a table showing the various changes in circuit conditions when deriving a cross-check combination from two sample code combinations, and Figs. 9 and 13 together form a block schematic diagram of a circuit according to the invention for converting the constant-total seven-element code combinations back into five-element start-stop teleprinter code combinations, for deriving from every five received code combinations a counter-check combination, and for comparing the derived counter-check combination with that received. In order to simplify the description and drawings as much as possible, full circuit diagrams of the various gate circuits, counting chains, registers, etc. have not been given, but suitable references have been given to other specifications from which full particulars may be obtained. Thus, Figs. 1 to 4 and 9 to 13 are functional in nature and are intended to show the processes involved rather than the actual means used. The various symbols used in these figures will be explained as they enter the description.

Where connections are taken from one figure to another, the points where leads enter or leave a particular figure have been identified by the reference letter L and a serial number together with the figure number. It has not, however, been found practicable in many cases to allot similar positions to similarly numbered leads on adjoining sheets.

In carrying out this embodiment of the invention considerable use is made of static electrical switches.

A "static electrical switch" is defined as a device having a permanently positioned electrical path the effective impedance of which may be either of two different values, change from the one to the other value being effected by an appropriate change in a controlling electric or magnetic field from one stable condition to another.

The term "static electrical switch" as used in this specification should be interpreted to include any device falling within the terms of this definition and in any case includes thermistor trigger circuits, hot or cold cathode discharge tubes, hard tube trigger circuits, cathode ray tubes and metal rectifier circuits.

Throughout the description a telegraph speed of 50 bauds is assumed.

Referring now to Figs. 1 to 4, the timing of the various stages of reception, translation and transmission is controlled by means of a time scale circuit shown in Fig. 1. This time scale circuit comprises a plurality of static electrical switches in the form of three multi-cathode gas-filled discharge tubes shown as blocks C1, C2 and C3 and three gas-filled high-speed trigger tubes shown as gating devices G2, G3 and G4. The time scale circuit is connected and designed to operate in the same manner as that shown and described in detail in the specification of the co-pending application of V. J. Terry—D. S. Ridler—D. A. Weir filed March 29, 1949, and bearing Serial No. 84,104. Its function is to count five-kilocycle negative pulses applied at points marked P−. As explained in the above-mentioned specification, C1 is arranged to count all the pulses, C2 to count every tenth pulse and C3 to count every hundredth pulse. At any particular time after counting begins, a discharge will be present across a particular gap in each tube, which gap will depend upon the number of pulses counted and hence upon the time that has elapsed. Thus after, say, 175 pulses have been counted gap 1 in the hundreds tube C3 will be fired together with gap 7 in the tens tube C2 and gap 5 in the units tube C1. Since there are five pulses every millisecond it will be apparent that the time interval which must elapse before the above condition can be reached is 175÷5=35 milliseconds. In the aforesaid co-pending application, it is further explained and shown how the simultaneous firing of two or three specific gaps in respective tubes may be used to open a gating circuit at a particular time. In order to reduce the complexity of Figs. 1 to 4 and 9 to 13 of the present case, circuits for connecting the outputs of the counting tubes with various gates which are required to be opened at specific times have been omitted but, instead, the times at which potentials are derived from the time scale circuit are shown against various conductors connected to gates thus: T1, 21, 41 etc. These figures are the time intervals in milliseconds after the starting of the time scale circuit. In order to determine which gaps must be fired at a particular time, it is only necessary to multiply the time in milliseconds by five. Thus at time T21, 105 pulses will have been counted and the gaps fired will be gap 5 of C1, gap 0 of C2 and gap 1 of C3.

It is assumed that transmission of the seven-element combinations takes place on a synchronous basis over a line or a radio path, whichever is convenient. In order to maintain the receiver in synchronism with the transmitter, a synchronising pulse is sent out at regular intervals from the transmitter as shown symbolically on the right of Fig. 2. These synchronising pulses are also directed to provide one input to a gate G1 (Fig. 1). This gate requires two inputs before it can produce an output as denoted by the figure "2" within the gate symbol. A gate of this type is disclosed in the specification of British Patent No. 636,700 and its operation is there fully explained.

The other input to gate G1 is from the stop tube SP of a start-stop trigger device or flip-flop F1. This latter may comprise, for example, a pair of cold-cathode, high-speed trigger tubes interconnected in well-known manner, whereby the firing of either tube extinguishes the other. Thus, as soon as the synchronising pulse is applied to gate G1, this gate opens and causes the start tube ST to be fired, so extinguishing the stop tube. The output of tube ST allows pulses from P− to pass through gate G2 into counting tube C1, thus bringing the time-scale circuit into operation.

The start-stop teleprinter signals for conversion are fed in from a tape-controlled auto-transmitter shown on the left-hand side of Fig. 1. This auto-transmitter is only operative as long as a control potential is applied thereto over lead L1 from Fig. 4. For the present it can be assumed that such a potential is applied. The synchronising pulses are phased and timed so as to coincide with the leading edge of the start element emitted by the auto-transmitter. Thus, the periodicity of the synchronising pulses is determined by the length of the combinations emitted by the auto-transmitter. If the latter is working on a seven-element code basis, the synchronising pulses occur every 140 milliseconds. If on the other hand a seven-and-a-half-element code is in use, the pulses are spaced 150 milliseconds apart.

At 30, 50, 70, 90, and 110 milliseconds, gating potentials are applied to gate G6. These potentials are applied at the theoretical centres of the five permutable elements of the signal combination. Since othe other input of G6 is from the space lead at the output of the auto-transmitter it follows that G6 will give an output of one pulse for each space element in the code combination. These latter pulses will pass through gate G7 to the character register R2. R2 is a non-repeating pattern-movement register comprising a plurality of static electrical switches, for example five cold-cathode gaps interconnected in the manner described in co-pending application of A. D. Odell, filed March 3, 1950, and bearing Serial No. 147,378. The non-repeating character of the register is indicated by a circular appendage to the right hand block 3 in the chain. The five permutable elements of the signal combination are stored successively on tube 7 of R2. Before storage of the first permutable element (at times 3 and 23 milliseconds) and between storage of successive elements (at times 43, 63, 83 and 103 milliseconds)

stepping pulses are gated through gate G8 to step the pattern on R2. The tubes of R2 are left unfired if a mark is received and fired to record a space. After 110 milliseconds the received code combination (i. e. the signal combination less the start and stop elements) is stored as a pattern on R2, the first permutable element being eventually registered by the condition of tube 3 on the right of the chain.

Before proceeding further a more detailed description will be given of gate G7, since the nature of this gate is rather different from those disclosed in said British patent specification No. 636,700 already referred to, although it uses the same principles.

Gate G7 has two input circuits and one output circuit as shown and the figure "1" inside the symbol means that either input is sufficient to produce an output. A suitable circuit for achieving this is shown in Fig. 5. The two input terminals are denoted 1 and 2 and the output terminal is denoted 3. Fig. 5 shows also gas-filled tubes V1 and V2 as illustrations of conventional means for applying an input potential to terminal 1 and utilising the output potential from terminal 3 respectively. The positive voltage applied to the upper end of R1 normally causes a current to flow through this resistor, rectifier X1, terminal 1 and resistor R3 to earth. Due to the voltage drop across R1, the voltage applied via rectifier X2 and terminal 3 is insufficient to fire gas-discharge tube V2. Resistor R3 forms the cathode load of a gas discharge gap V1 which may be part of a single tube or of a multi-gap tube such as C1, C2 or C3 (Fig. 1). When gap V1 is fired, it develops a potential across R3 which is sufficient to block rectifier X1. There is now no current through R1 consequently there is no voltage drop across it. Thus, the full positive potential is available to fire tube V2 which in turn produces a positive voltage output by virtue of the voltage developed across its cathode load resistor R4.

Terminal 2 is assumed to be connected to a third gas discharge gap (not shown) in the same manner as terminal 1 is connected to gap 2, hence if this third gap is fired, and not V1, the potential applied to the upper end of R2 will be applied over rectifier X4 and terminal 3 to fire V2 as before.

The same principle can be extended to more complicated gating arrangements. For example, in Fig. 6 is shown a gating circuit having three inputs, any two of which will suffice to produce an output. This would be represented symbolically by a circle with three input arrows, one output arrow and a figure "2" in the centre. An example of such a gate is G34 appearing in Fig. 4. Other examples appear in Figs. 9 to 13 to be met with later.

Referring to Fig. 6, it is assumed that the input terminals 4, 5 and 6 are connected to the cathodes of respective discharge devices in the same manner as terminal 1 is connected to device V1 in Fig. 5. If a blocking potential is simultaneously present on, say, input terminals 4 and 5 then rectifiers X5 and X7 are blocked and the voltage applied via resistor R5 is passed through rectifier X11 to the output terminal 7 which may be conveniently connected to the trigger of a device such as V2 in Fig. 5. If blocking potentials are present on input terminals 5 and 6, rectifiers X8 and X10 are blocked and a voltage is passed via resistor R7 and rectifier X13 to the output terminal 7. Similarly, if blocking potentials are applied to input terminals 4 and 6, rectifiers X6 and X9 are blocked and a voltage is passed to output terminal 7 via resistor R6 and rectifier X12.

Also appearing in Figs. 1 to 4, are gates having three operative inputs out of four (e. g. G8 and G11 in Fig. 1). The circuit for achieving this is somewhat complex but represents a logical development of the circuits of Figs. 5 and 6. It has not, therefore, been considered necessary to show this further circuit.

Returning to Figs. 1 to 4, while the received code combination is being stored on the character register R2, the number of space elements is being recorded by the space register which is a non-repeating 8-unit pattern register R3 (Fig. 3) also connected as described in said co-pending application of A. D. Odell. This register has impressed thereon a pattern (reading from left to right) as follows M M S M M S S M, that is to say, tubes 2, 3 and 6 of the chain are fired and the remainder extinguished. At intervals of 30, 50, 70, 90 and 110 milliseconds, i. e. in the theoretical centres of the five permutable elements of the incoming signal combination—a pulse is passed from gate G20 to gate G21 provided that at the same time a positive potential is present on lead L2 which is connected to the space lead (Fig. 1) and there is a positive potential applied to gate G20 from F3 (a condition which will be referred to later but which is assumed to be present at this time). Thus, for every space element in the received code combination (with one exception as will be explained later), one pulse is passed from gate G21 to register R3. This causes the pattern to progress by one step to the right. At intervals of 20, 40, 60, 80, 100 milliseconds from the beginning of the start element—i. e. at the beginning of each permutable element—gate G24 is opened to allow the condition of tube 1 of the register to be repeated by tube 8 although this does not cause the pattern to progress along the register R3. The number of spaces recorded on the space register determines the translation to be effected in order to produce a seven-element code combination uniquely representative of the original five-element code combination. Before proceeding further with the circuit description, a fuller explanation will be given of the various stages of translation involved as shown in the table of Fig. 7.

In the first place, since only the five permutable elements of an incoming signal combination are involved, it is necessary to add two further elements to bring the number up to the required seven. This is achieved by adding a two-element prefix, the nature of which is shown in the third column. In the cases of combinations containing one, two and three spaces the prefix merely adds the requisite number of additional spaces to bring the seven-element total up to three spaces and four marks. In the case of these combinations no further translation is required and the transmitted seven-element combination consists of the two-element prefix followed by the original five-unit code combination.

In the case of the remaining combinations, namely those containing no spaces, four spaces and five spaces, an invariable prefix is transmitted which is different from those transmitted in the case of one-space, two-space and three-space combinations and further translation is necessary to adjust the number of spaces to the required number. In the fourth column of the table of Fig. 7, opposite the no-space, four-space and five space combinations, are shown the last five elements of the corresponding seven-element combinations. Where a translation has been carried out, the translated elements have been shown within small individual squares.

It is believed that with this explanation, Fig. 7 is self-explanatory and it will not be referred to again in the course of the description.

It will first be assumed that the received code combination is one containing one space, for example, M M S M M. When this combination is received, it is registered on the character register R2 (Fig. 1) by the firing of the middle tube 5 only. At the same time, the fact that there is only one space element means that the pattern on register R3 (Fig. 3) is only advanced once and since the space element is the third element to be received, it is the pulse at 70 milliseconds which causes the pattern to be advanced. After this pulse has been passed to R3 the pattern on R3 reads as follows M M M S M M S S. Ten milliseconds later gate G24 is opened to cause tube 8 to assume a spacing condition in agreement with tube 1. Tubes 1 and 2 of R3 continue to record two spaces which is the requisite prefix for a code combination containing only one space, no other modification or translation being necessary as previously explained.

At 121 milliseconds, gates G10 and G12 (Fig. 1) open to cause the condition of tube 1 of the space register R3 (Fig. 3) to be passed via lead L6 to tube 2 of the prefix register R1 (Fig. 1) so that this tube records a space. The prefix register R1 is also connected as described in said co-pending application of A. D. Odell and so when a stepping pulse is passed via gate G11 at 122 milliseconds, the discharge in the left-hand tube 2 of R1 is transferred to the right hand tube 1 and tube 2 is extinguished. At 122 milliseconds also a stepping pulse is passed via gates G27 and G21 (Fig. 3) to the space register R3 causing the pattern thereon to be advanced to read M M M M S M M S.

At 123 milliseconds gates G10 and G12 (Fig. 1) again open to cause tube 2 of the prefix register R1 to be fired and so to represent a space in accordance with the condition of tube 1 of the space register R3 (Fig. 3). Both tubes of R1 are thus fired to represent a prefix of two spaces. The space register R3 receives further stepping pulses at 124, 126, 128, 130, 132, 134 and 136 milliseconds respectively and these stepping pulses merely act to clear the pattern off the tubes 1 to 8 and leave them all in a non-conducting condition.

If code combinations containing two spaces and three spaces are received, the action is similar to that which has just been described except that the pattern on the space register R3 is advanced by two steps for two spaces and by three steps for three spaces. In the case of a two-space combination, tubes 1 and 2 of R3 read S M respectively and this is the appropriate prefix which is subsequently transferred to the prefix register R1 (Fig. 1). In the case of a three-space combination, the prefix read off R3 and stored on R1 is M M. All that remains to be done in the above three cases is to read off and transmit the prefix stored on R1 followed by the unchanged code combination stored on R2. This takes place during the receipt of the next code combination.

At 138 milliseconds the stop tube SP of flip-flop F1 (Fig. 1) is fired and this, by well-known action, causes the start tube ST to be extinguished so that no more pulses go to the time-scale circuit. At 138 milliseconds the number of pulses which have been counted by the time-scale circuit is 138×5=690. This means that a discharge is present across gaps 0, 9 and 6 respectively of tubes C1, C2 and C3. It is thus necessary to reset only tubes C2 and C3 to the initial condition i. e. with the discharge across gap 0 in either tube. This resetting is done by a transient voltage pulse induced when F1 changes over to the stop condition.

When the succeeding code combination is received, the time-scale circuit (Fig. 1) is again started into operation as previously described and the first pulse therefrom (the timing of which is indicated as "0") passes through gate G13 (Fig. 2) to fire the mark tube MO of the output flip-flop F2, if it is not already fired. This causes the extinguishing of the space tube SO, if this was fired.

The output flip-flop F2, supplies a keying device shown by a block and assumed to be of any well-known kind. The output of this keying device is taken to the receiving device over any convenient transmission path. For example, the keying device could modulate the phase or amplitude of a carrier wave transmitted over a radio path or it could simply apply marking or spacing potentials to a telegraph line. The precise method of transmission is immaterial to the invention.

At a time of 0.2 millisecond later i. e. on the occurrence of the next pulse from the time-scale circuit, gate G14 is opened if a potential is present on lead L7. This lead is connected to tube 1 of the prefix register R1 (Fig. 1) and a potential is only present on lead L7 when tube 1 is fired to represent a space. Thus, if the prefix stored is S M or S S, G14 will be opened at 0.2 millisecond and a pulse will be passed through this gate and gate G15 (which normally receives a second gating input from G19) to fire the space tube SO of the output flip-flop F2 and extinguish the mark tube MO. Thus, the output relay changes over to the spacing contact and a space is transmitted for the first element of the prefix which is the first element of the constant total seven-element code combination. If the prefix stored on R1 is M M or M S, gate G14 will not be open and the mark tube MO of the output flip-flop will remain fired.

At 1 millisecond—i. e. after 5 pulses—gate G11 (Fig. 1) is opened to allow a stepping pulse to pass into the prefix register R1 thus stepping the pattern on R1 so that the second element of the prefix is now recorded on tube 1 of R1.

At 2 milliseconds, gate G9 is opened to allow the condition of tube 3 of R2 to be transferred to tube 2 of R1 via gate G10. The third element of the seven-element combination is now registered on tube 2 and the second element on tube 1.

At 3 milliseconds, G8 opens to allow a stepping pulse to step the pattern on R2 along by one step so that the last four elements of the seven-element combination are now registered on tubes 3 to 6 of R2. It will be seen that the original pattern on tubes 1 to 7 of R1 and R2 has advanced by one step to the right in substantially the same manner as if all seven tubes formed a single continuous chain.

At 20 milliseconds gate G13 (Fig. 2) again opens to cause a pulse to fire tube MO if the first transmitted element was a space. 0.2 millisecond later the condition of tube 1 of R1 is again examined via gate G14 and if the second element of the prefix is a space then F2 goes back to space again. It will be observed that in the event of two consecutive elements being spaces there is a momentary switch-over to mark between them. It is assumed that the inertia of the output keying device will prevent this switch-over from being passed to the line.

After the examination of the second element, the pattern on R1 and R2 is again stepped in two stages and the remaining five elements are examined and transmitted in sequence, the pattern on R1, R2 being stepped after each examination.

It will be noted that the first two steppings of the pattern on R2 take place in sufficient time to allow the first permutable element of the second code combination to be registered on tube 7 of R2.

So far, it has been assumed that the code combinations received have contained one, two or three spaces so that no translation is necessary beyond the addition of a prefix which is S S, S M or M M depending on the number of spaces in the other five elements.

It will now be assumed that the combination to be translated is S S S S M namely one containing four spaces. This is recorded on R2 by the firing of tubes 3, 4, 5 and 6. At the same time the pattern on R3 (which is re-established by a potential passed over lead L3 every time the stop tube SP is fired (Fig. 1)) is stepped by four positions, one for each space element. After each stepping, the condition of tube 1 is examined by gate G24 and its condition repeated by tube 8. The progress of the pattern on R3 during the receipt of the first four permutable elements is shown by the following table in which, for ease of reading, the numbers of the tubes have been written from left to right instead of from right to left as they appear in Fig. 3. It is to be noted that the only times listed are "significant" ones i. e. times when a change in the condition of the tubes takes place.

| Tubes | 1 | 2 | 3 | 4 | 5 | 6 | 7 | 8 |
|---|---|---|---|---|---|---|---|---|
| Initial pattern | M | S | S | M | M | S | M | M |
| 30 ms | S | S | M | M | M | S | M | M |
| 40 ms | S | M | M | M | S | M | M | S |
| 50 ms | S | M | M | S | M | M | S | M |
| 60 ms | S | M | S | M | M | S | M | S |
| 70 ms | M | M | M | S | M | S | S | M |
| 90 ms | M | S | M | M | S | S | M | M |

At 101 milliseconds gate G23 (Fig. 3) is open since tubes 5 and 6 are both fired and a gating potential is normally present on lead L10 as will be explained later. Accordingly, a pulse is passed to fire tube F of a three-stage, trigger device F3. Tube F being fired to represent four spaces, extinguishes the "normal" tube N which was previously fired.

At 121 and 123 milliseconds, the condition of tubes 1 and 2 of the space counter R3 is examined and transferred to tubes 1 and 2 of the prefix register R1 (Fig. 1). The prefix thus set up on R1 is M S (reading from right to left) and this prefix is always sent if the received code combination contains no spaces or four or five spaces. The complete seven-element code combination set up on tubes 1 to 7 of R1, R2 thus reads M S S S S M.

Upon receipt of the next code combination, the combination set up on R1, R2 is read off as previously described, the output flip-flop F2 (Fig. 2) being biassed to mark every twenty milliseconds and brought back to space 0.2 millisecond later if tube 1 of R1 is fired to denote a space element. This time, however, the firing of the four-space tube F of F3 (Fig. 3) acts via lead L9 and gate G30 (Fig. 3) to open a gate G17 to pulses occurring at 40.4 and 80.4 milliseconds. Thus, at 40 milliseconds, F2 is biassed to mark by the firing of MO and at 40.2 milliseconds, SO is fired in accordance with the spacing nature of the third element, but at 40.4 milliseconds, MO is again fired by a pulse through gates G17 and G13 so that a mark is sent for the third element instead of a space. The fourth element is sent out without change but the fifth element is reversed in the same way at 80.4 milliseconds so that the seven-element code combination finally transmitted is M S M S M S M. There may be a tendency to vibration in the transmitting contacts in the period of 0.4 millisecond at the commencement of the third and fifth elements but it is believed that this can be tolerated for the sake of simplicity of the translation circuits thereby resulting.

The code combination S S S M S and S M S S S each containing four spaces are dealt with in a similar manner to that just described, the gate G23 being opened to operate the tube F of F3 at 111 milliseconds. The prefix M S is inserted and the third and fifth space elements of the seven-element combination are replaced before transmission by mark elements in the same manner as that described. The two code combinations sent out are S M S M M S and M S M M M S S respectively.

The other two four-space combinations, namely, S S M S S and M S S S S have the same M S prefix inserted but undergo not only a second but a third translation before being transmitted, as will now be explained.

Figure 2:
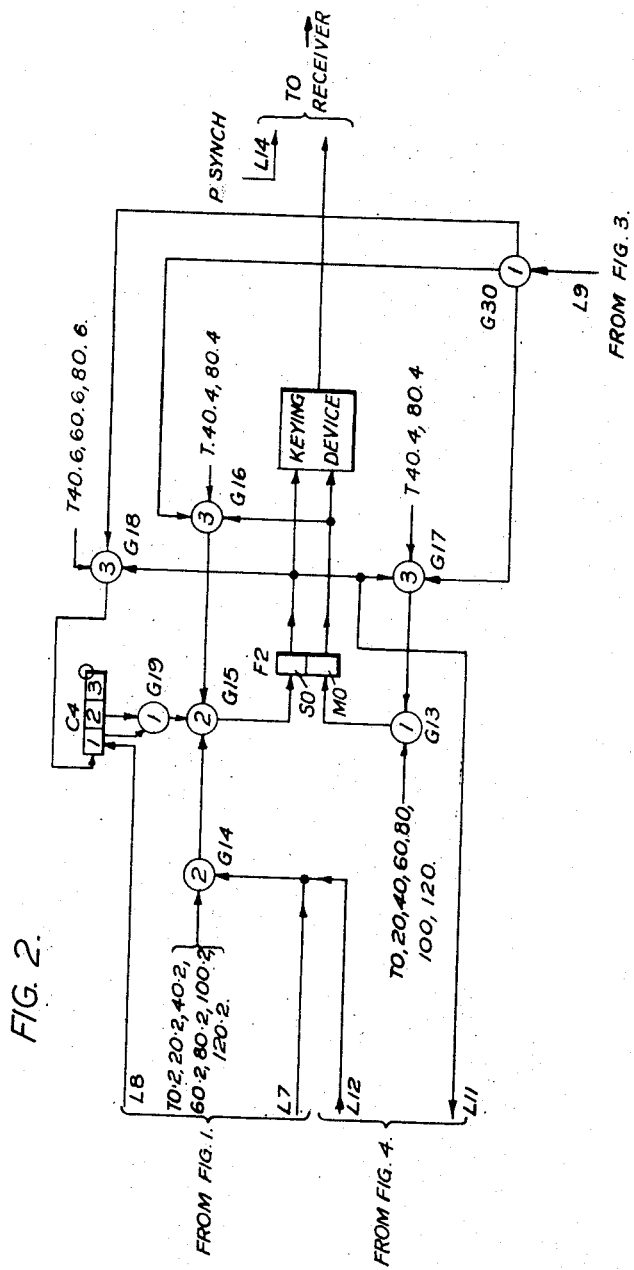

In the case of the combination S S M S S, the seven-element combination set up on R1, R2 (from right to left) is M S S S M S S. The third element (being a space) is converted to a mark as previously described at 40.4 milliseconds but the fifth element is already a mark. However, the firing of the four-mark tube F of F3 (Fig. 3) also opens a gate G16 (Fig. 2). Gate G16 acts via gate G15 (which, as previously stated, normally receives a second input from G19) at 80.4 milliseconds to fire the space tube SO so that a space is sent for the fifth element instead of a mark.

It should be noted that the gates G16 and G17 are so interconnected with the output flip-flop F2 that, provided the four space tube F of flip-flop F3 (Fig. 3) is fired, the third and fifth elements of the seven-element code combination set up on R1, R2 will always be reversed whether they be mark or space. Thus, the combination M S M S S S S becomes M S S S M S S and the combination M S S S M S S becomes M S M S S S S. Each of these combinations contains more than three spaces, so before they are finally transmitted, they are subjected to the action of a space limiter. This ensures that after the prefix has been transmitted (which contains one space) only two more spaces are sent out, after which the transmitting contacts remain on the marking side for the remaining elements of the seven-element combination irrespective of the condition of tube 1 of R1 (Fig. 1)

The space limiter (Fig. 2) comprises a three-step, non-repeating, counting chain C4 which may, for example, consist of three, cold-cathode, gas-discharge gaps interconnected in well known manner such that successive pulses applied to all the gaps in common cause the discharge first to pass from gap 1 to gap 2 and then from gap 2 to gap 3. Initially, and before each combination is transmitted, a discharge is present across gap 1, the output of which supplies a potential to open gate G19.

At 40.6 milliseconds, G18 is opened if tube SO of the output flip-flop F2 is fired, which in turn, means that the third element of the seven-element combination is a space. The opening of gate G18 causes a stepping pulse to be passed to counting chain C4 to cause the discharge to pass from gap 1 to gap 2. This signifies two spaces (counting the prefix) have been transmitted. Since the output of gap 2 also feeds G19, the latter gate remains open.

At 60.6 and 80.6 milliseconds, the condition of F2 is again examined. If another space element is detected (meaning that the required total of three has been reached), C4 is again stepped and the discharge passes to gap 3. When this occurs, gate G19 is closed thereby closing gate G15. No further space elements can now be transmitted since no voltage can be applied to fire the space tube SO after F2 has been biassed to the mark position by the firing of the mark tube MO at the beginning of the next signal element. The combinations M S S̲ M S S and M S M̲ S S S S thus become M S S̲ S M M̲ M̲ and M̲ S M S S M M, respectively.

When the five-space combination is received for translation it is registered on R2 by the firing of tubes 3 to 7 (Fig. 1) and the first four spaces cause the space register R3 (Fig. 3) to step along to give the pattern M M S S M M S M, as previously described. This causes the four-space tube F of F3 to fire and so closes gate G20 and opens gate G25. The closing of gate G20 means that the fifth space element does not cause the pattern on R3 to take a further step.

At 110 milliseconds, a pulse passes through gates G25 and G26 to fire the all-space/all-mark tube A of trigger device F3. The extinguishing of the four-space tube F removes a potential from lead L9 and cuts off the reversing arrangements and space limiter of Fig. 2.

The firing of tube A opens a gate G29 (Fig. 3) which supplies two outputs, one to gate G28 and the other via lead L5 to a gate G5 (Fig. 1).

At 122 and 124 milliseconds, the pattern on the space register R3 (Fig. 3) is advanced by two steps and the prefix M S is transferred to the prefix register R1 (Fig. 1), as previously described. The pattern on R3 thus becomes M M M M S S M M.

At 125 milliseconds, gate G28 is opened and the condition of tube 1 of R3 transferred over lead L4 and gate G7 to tube 7 of R2 (Fig. 1).

At 126 milliseconds, gate G5 opens to allow a stepping pulse to pass via gate G8 to step the pattern on R2. Also at 126 milliseconds, the pattern on R3 is stepped along one step. This process is repeated until the condition of tubes 1 to 5 of R3 have been transferred to tubes 3 to 7 of R2 thus driving out the five-space pattern originally stored on R2. The combination now registered on R, R2 (reading from right to left) is now M S M S S M M and it is this seven-element combination which is transmitted to represent the all-space, code combination.

In the case of the all-mark combination, the original pattern remains on the space register R3 namely, M M S M M S S M. At 111 milliseconds, gate G22 (Fig. 3) is opened since tubes 2 and 3 are both fired, a gating potential is assumed to be present on lead L10, and the all-space/all-mark tube A of F3 is fired. The action from then on is the same as described for the all-space combination except that the seven-element combination set up on R1, R2 and subsequently transmitted, is M S S M M S M̲, which is the pattern originally set up on tubes 1 to 7 respectively, of the space register R3.

It is to be noted that the all-mark combination will always be the first combination to be transmitted when the circuit begins its first cycle of operations since this code combination is represented when all the tubes of the character register R2 are left unfired. This will have no undesirable effect at a receiving teleprinter since it is usual to preface transmission with the all-mark (letter shift) combination to ensure that the teleprinter is in the right condition to print normal characters in the lower case. The first combination received from the auto-transmitter will thus be the second combination to be translated.

The arrangements so far described provide for the conversion of thirty-two start-stop teleprinter code combinations into respective seven-element code combinations having a constant proportion of marks and spaces. It is thus possible at a receiver to detect the presence of an incorrect combination by virtue of the incorrect number of marks and spaces. The arrangements now to be described provide for the transmission after a given number of seven-element combinations of an additional cross-check combination, the respective elements of which are determined from a computation of the corresponding elements in the previous combinations. By this means, it is possible at the receiver not only to detect which combination but which element of that combination, is at fault.

Let it be assumed first of all, that the cross-check combination is inserted after only two code combinations have been transmitted. The derivation of the cross-check combination in this case may be seen with the aid of the following example:

*Example 1*

| | | | | | | | |
|---|---|---|---|---|---|---|---|
| First combination | M | S | S | M | M | S | M (Letter Shift) |
| Second combination | S | S | S | M | M | M | M |
| Cross-check combination | S | M | M | M | M | S | M |

One way of regarding the manner in which each element of the cross-check combination is formed is to consider that an odd number of spaces adds up to a space while an even number of spaces (or no spaces) adds up to a mark. A similar result may be obtained by regarding the first two combinations as binary numbers; a mark element representing zero and a space element representing one. The two numbers are added together without carry-over between columns. Regarded in this way the example just given becomes:

*Example 2*

```
0 1 1 0 0 1 0
1 1 1 0 0 0 0
─────────────
1 0 0 0 0 1 0
```

In practice, it is uneconomical in line-time to insert the cross-check combination after every two combinations and, in general, it is preferred to insert it after, say, five combinations have been transmitted. The same principles of derivation apply, as will be seen from the following example, in which the first two of five combinations are identical with those used in Examples 1 and 2 already given:

*Example 3*

| M | S | S | M | M | S | M |
| S | S | S | M | M | M | M |
| S | M | S | S | M | M | M |
| M | M | S | S | S | M | M |
| M | S | M | S | M | S | M |
|---|---|---|---|---|---|---|
| M | S | M | S | S | M | M |

Returning now to Figs. 1 to 4 the cross-check combination is set up on the cross-check register R4 (Fig. 4). This is a seven-unit, non-repeating pattern-movement register of the type already referred to. Initially there is set up on R4, a "pattern" or combination of seven marks, i. e. tubes 1 to 7 are extinguished. This represents in the binary notation, a total of zero.

At a time of 6 milliseconds from the starting of the time-scale circuit (Fig. 1), the mark tube M of a flip-flop F5 (Fig. 4), is fired by a pulse passed through a gate G38.

At 7 milliseconds, the condition of tube 1 of the cross-check register R4, is examined by a pulse through a gate G35. If tube 1 is fired to represent a space, F5 is changed over to space by the firing of tube S.

At 8 milliseconds, the pattern on R4 is stepped by a pulse applied through a gate G34, the direction of stepping in Fig. 4 being from left to right.

At 9 milliseconds, a pulse is applied to a gate G31 to examine simultaneously the conditions of the mark tube M of flip-flop F5 and the space tube SO (via lead L11) of the output flip-flop F2 (Fig. 2). If both these tubes are fired, G31 provides an output potential which is passed via gates G32 and G33 to fire tube 7 of the cross-check register R4. Thus, a space will be inserted in the pattern on R4 each time a space (on F2) is added to a mark (on F5).

At 10 milliseconds, a pulse is applied to a gate G37 to examine simultaneously the conditions of the space tube S of flip-flop F5 and the space tube SO (via lead L11) of the output flip-flop F2 (Fig. 2). If both these tubes are fired, G37 provides an output potential which is passed via gate G38 to re-fire the mark tube M of flip-flop F5. Thus, a mark will be recorded on F5 each time a space (on F2) is added to a space (on F5).

At 11 milliseconds the condition of the space tube S of flip-flop F5 is examined by a pulse applied through a gate G36 and if the space tube is still fired, a potential is passed via gates G32 and G33 to fire tube 7 of the cross-check register R4. Thus, a space is recorded in tube 7 if a space on F5 is added to a mark on F2 since the fact that F5 is still in the space condition implies that F2 is in the marking condition.

At 26, 46, 66, 86, 106 and 126 milliseconds, the foregoing cycle of events is repeated so that by 131 milliseconds the pattern set up on R4 represents the addition of the original combination stored thereon and the constant-total code combination transmitted by the output relay F2 (Fig. 2).

At 136 milliseconds, the flip-flop F5 is biassed to mark via gate G38.

At 137 milliseconds, the condition of tube 1 of the cross-check register R4 is examined via gate G35. If tube 1 is fired to signify a space, this fact is recorded by the firing of the space tube of F5.

It should be noted that the last two times mentioned, occur after the final stepping of the pattern on R4 so that the ultimate condition of tube 1 of R4 is recorded by the ultimate condition of flip-flop F5.

The operation of the circuit in setting up the cross-check combination has now been described in general terms. The operation of this part of the circuit will, it is believed, be more readily understood by a consideration of what actually takes place when two sample combinations are added together. For convenience the two combinations chosen are those quoted in Example 1 already given. Furthermore, it has been considered preferable to set out the various steps in tabular form in Fig. 8 rather than to incorporate them into the text.

Referring now to Fig. 8, it is to be observed first of all, that the only times which have been listed in the first column are "significant" times i. e. times at which a change takes place in the condition of either of the flip-flops F2 and F5 or in the condition of the cross-check register R4. The line corresponding to time "0" represents the conditions obtaining at the beginning of each cycle.

The broken lines and bracketed symbols in the second column (representing the condition of the output flip-flop F2) have been inserted to give a truer picture of the seven-element combinations being transmitted although it will be appreciated that there will be no significant change in the condition of the output relay between successive elements of the same kind.

In order to give a truer picture of the combinations set up on R4, the order of the tubes in Fig. 8 has been reversed from that shown in Fig. 4. Thus, in Fig. 8 the direction of stepping is from right to left.

With the foregoing explanation it is believed that Fig. 8 will be readily understandable.

It will be seen from Fig. 8 that at the end of the first cycle, the combination set up on R4 is the same as the first combination sent out from F2. The reason for this will be obvious when it is recalled that the original "all-mark" setting on R4 represents a total of zero in binary notation.

At the end of the second cycle the combination set up on R4 will be seen to be identical with that obtained theoretically in Example 1.

Fig. 8 shows in detail how the cross-check combination is derived from two previous code combinations. In practice, as already explained, this number is too few and the circuit of Figs. 1 to 4 is arranged to insert the cross-check combination after every five code combinations. It is, however, considered to be unnecessary to show in the detailed form of Fig. 8 how five code combinations are added together to produce corresponding cross-check combination.

The arrangements now to be described provide for the stopping of the auto-transmitter after five code combinations have been sent out and for the transmission of the cross-check character derived in the manner already explained.

The counting of the five code combinations is done by a six-unit counting chain C5 (Fig. 4). Before the first combination is transmitted, this counting chain is set in a condition where the first gap 0 is fired, the remaining gaps being extinguished. This may be achieved by momentarily operating the make-before-break contacts K1. The firing of gap 0 results in the firing of the "normal" tube N of a flip-flop F4. The output of tube N supplies potentials to various gates, the numbers of which will be apparent from the drawings and also via lead L1, it supplies a potential to cause the auto-transmitter (Fig. 1) to send code combinations into the character register R2.

At 138 milliseconds, after the commencement of the first cycle of operations, a pulse from source P– (Fig. 4) is gated through a gate G30 to step the discharge in counting chain C5 from gap 0 to gap 1 and so to record that one combination has been transmitted. Similarly, at the end of the second combination, the discharge passes to gap 2 and at the end of the fifth combination gap 5 is fired.

The firing of gap 5 results in the firing of the "check" tube C of F4 and the extinguishing of the normal tube N. The firing of tube C causes gating potentials to be applied to gates G39 and G40, whose purpose will be explained later.

The extinguishing of tube N has the following results:

(a) By removing a potential from lead L1 it stops the auto-transmitter (Fig. 1) from sending any further code combinations into the character register R2.

(b) By removing a potential from lead L10, it disables certain gates (the numbers of which will be readily apparent from the drawings) and so ensures, inter-alia, that nothing alters the composition of either the code combination stored on the character register R2 (Fig. 1) or of the cross-check combination stored on register R4 (Fig. 4).

The next synchronising pulse applied to gate G1 (Fig. 1) starts the time-scale circuit again and the first pulse produced thereby fires the mark tube MO of the output flip-flop F2 (Fig. 2) by means of gate G13.

The next pulse from the time-scale circuit causes gate G14 to examine the condition of lead L12 connected to gate G39 (Fig. 4) which is, in turn, arranged to examine the condition of flip-flop F5. It has already been explained that after the cross-check combination has been set up on R4, flip-flop F5 is caused to assume a condition representative of the condition of tube 1 of R4. Thus, when G14 (Fig. 2) is opened at 0.2 millisecond, it effectively examines the condition of tube 1 of R4 on which tube is registered the first element of the cross-check combination. If this first element proves to be a space, the space tube SO of the output relay F2 (Fig. 2) is fired.

At 4 milliseconds gate G40 opens and supplies an input to gate G34. This, in turn, causes a stepping pulse to pass into the cross-check register R4 and so the pattern on R4 takes one step to the right. The second element of the cross-check combination is now recorded on tube 1 of R4.

At 6 milliseconds the mark tube M of flip-flop F5 is fired via gate G38.

At 7 milliseconds the condition of tube 1 of the cross-check register R4 is examined by a pulse through gate G35. If tube 1 is fired to represent a space, F5 is changed over to space by the firing of tube S. The second element of the cross-check combination is now registered by the condition of flip-flop F5.

At 8 milliseconds the pattern on R4 is stepped by a pulse through gate G34, gate G40 taking no further part in the operation. The third element of the cross-check combination is now recorded on tube 1 of R4.

At 20 milliseconds the mark tube of the output flip-flop F2 (Fig. 2) is fired.

At 20.2 milliseconds the second element of the cross-check combination is read off flip-flop F5 by means of gates G14 and G39 and the output flip-flop F2 is conditioned accordingly.

The remaining elements of the cross-check combination are read off and transmitted in a similar manner, the condition of tube 1 of R4 being repeated by flip-flop F5 after each stepping of the pattern on R4. The last two stepping pulses clear the pattern off R4 and leave it in its initial condition with all tubes extinguished.

The counting chain C5 is of the repeating type so that the next pulse at 138 milliseconds steps the discharge from gap 5 back to gap 0. This results in the changing-back of flip-flop F4 to the "normal" condition with tube N fired. The re-connection of an operating potential to lead L1 causes the re-starting of the auto-transmitter (Fig. 1) and the combination already stored on R2 is translated and sent out.

Since the number of code combinations sent out before the cross-check combination is determined solely by the counting chain C5, it will be apparent that this may be replaced, if desired, by a counting chain having, say, seven positions, in which case the cross-check combination would be inserted after every six code combinations. The actual number chosen would depend, for example, upon the amount of interference likely to be encountered but should not be too small for the reasons already given. Appropriate changes would also be necessary at the receiver, the nature of which changes will be apparent later. It is clear, also that such changes at transmitter and receiver can be made from time to time by agreement between the two stations to suit the interference conditions arising, for example, during different periods of transmission.

Referring now to the arrangements for reception and decoding shown in Figs. 9 to 13, the incoming seven-element code combinations arriving over lead L13 (Fig. 9) pass to a receiving device indicated generally by a labelled block. The contents of this receiving device will depend upon the nature of the communication medium between transmitter and receiver. As far as this invention is concerned, it is only necessary that the receiving device shall produce marking or spacing potentials at its output in accordance with the signals received from the transmitter.

Synchronising signals are received from the transmitter over line L14 (or some analogous communication medium) and pass to a gate G41. The first synchronising pulse fires the start tube ST of a flip-flop F11 so extinguishing the stop tube. The output of tube ST supplies a gate G42 and so brings into operation a time scale circuit comprising three multi-cathode counting tubes C11, C12 and C13, and three gating tubes G42, G43 and G44. This time scale circuit is similar to that shown in Fig. 1 and serves a similar purpose, namely, to time the various operations which take place.

At 10 milliseconds, the condition of the mark lead from the receiving device is examined by a gate G45 the third input to which is supplied from the normally fired tube N of the flip-flop F14. If a marking potential is present, then tube 35 of the multi-character register R12 is fired. This register is similar to the other pattern-movement registers already referred to, but in view of its complement of thirty-five tubes it is not practicable to show all of these even symbolically in Fig. 9. Furthermore, in this register all the tubes are initially unfired to represent spaces and are fired when they are required to signify a mark. This is the reverse of the arrangement already adopted and has been used merely for convenience. (It will be apparent, however, that by suitable adjustment of the circuit connections, either method of recording could be used in either circuit.) The examining time of 10 seconds coincides with the theoretical centre of the first element of the first seven-element code combination, so this element will be recorded on tube 35 of register R12.

At 22 milliseconds, a stepping pulse passes through gate G46 to step the pattern on the multi-character register R12 by one step to the right so that the first element of the first combination is recorded on tube 34.

At 30 milliseconds, the second element is recorded on tube 35 and at 42 milliseconds the pattern on R11 is again stepped so that the first and second elements of the first combination are now recorded on tubes 33 and 34 respectively, of R12.

The remaining elements of the first seven-element combination are set up on tubes 35 to 29. At 2 milliseconds after the commencement of the next cycle, the pattern is stepped on one step, and the next combination similarly registered. In this way all the elements of the first five seven-element combinations are registered on the multi-character register R12, the condition of tube 1 of the register eventually representing the first element of the first combination and the condition of tube 35, the seventh element of the fifth combination.

Figure 10:
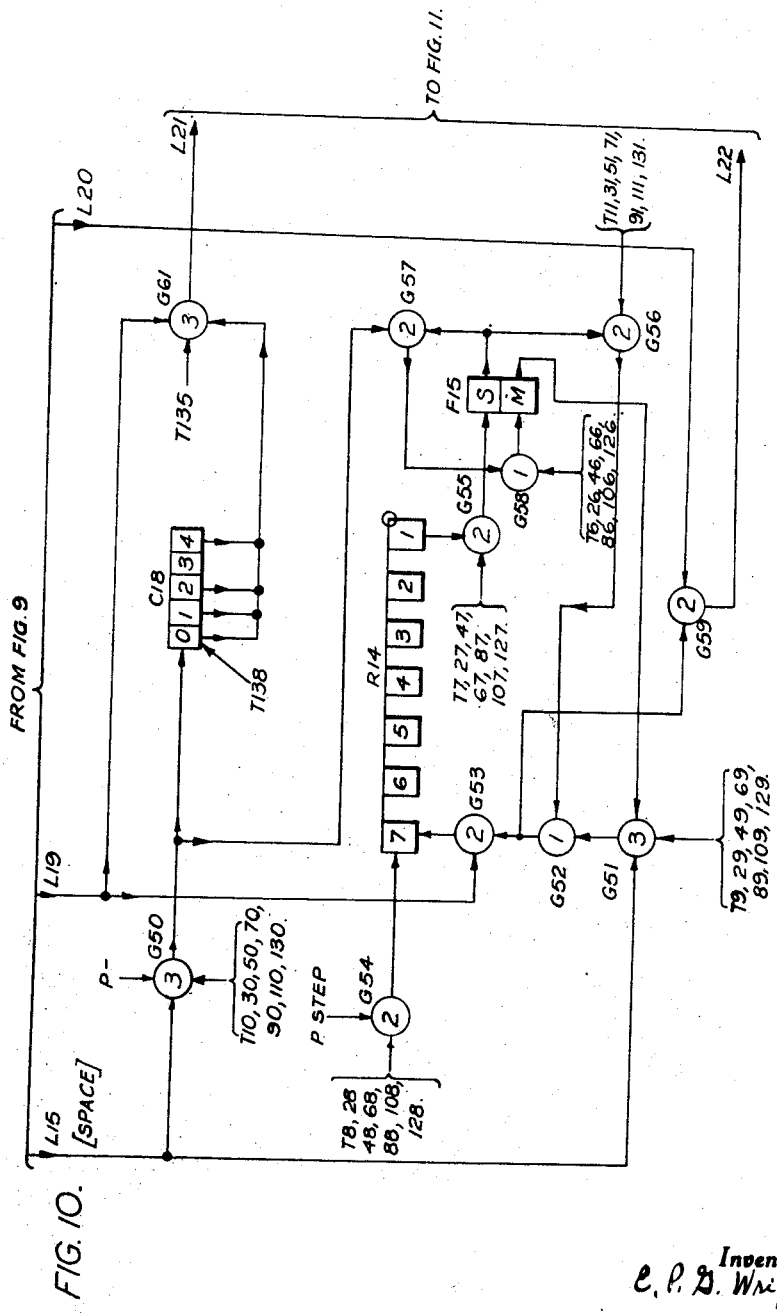

While the incoming code combinations are being stored in the multi-character register R12, the number of spaces in each combination is being counted by the space counter C18 (Fig. 10). This comprises a five-stage repeating, counting chain of discharge gaps in which a discharge is initially present across gap 0.

In the middle of each incoming signal element, a gate G50 examines the condition of lead L15 which is connected to the space output of the receiving device (Fig. 9). Each time a space element is detected, a negative pulse is passed to the space counter C18 (Fig. 10) to step the discharge from left to right one gap at a time. Thus if, for example, two spaces are counted, the discharge is transferred to gap 2, if four spaces are detected gap 4 is fired while a fifth space will cause the discharge to step back to gap 0. Only if the correct number of three spaces is present, will gap 3 be fired and remain fired.

At 135 milliseconds, a gate G61 examines the condition of the space counter and it will be seen that it will only receive an input from the latter if the number of spaces in the received combination is greater or less than the correct number. For the present it will be assumed that each of first five, seven-element code combinations has been correctly received so that there is no output from counter C18 to gate G61 and consequently, no output from the latter to lead L21.

At 138 milliseconds, the space counter C18 is reset by the firing of its gap 0 so as to be ready to count the number of spaces in the next seven-element combination.

While the first five, seven-element combinations are being registered on R12 (Fig. 9) and their space element content is being determined by C18 (Fig. 10), a counter-check combination is set up on the counter-check register R14 (Fig. 10).

The counter-check register R14 is a non-repeating pattern-movement register similar to the cross-check register of Fig. 4 and like the cross-check register, it is initially set in the condition where all seven tubes are unfired to represent an all-mark combination or zero in the binary notation.

The derivation of the counter-check combination is generally similar to that of the original cross-check combination and so will only be outlined in general terms.

At 6 milliseconds the mark tube of a flip-flop F15 is fired via a gate G58.

At 7 milliseconds the space tube of flip-flop F15 is fired via a gate G55 if tube 1 of register R14 records a space.

At 8 milliseconds the pattern on R14 is stepped from left to right by a pulse from a gate G54.

At 9 milliseconds a pulse is applied to a gate G51 to examine simultaneously the conditions of the mark tube M of flip-flop F15 and the incoming space lead L15. If gate G51 receives an input from each of these sources, it passes a pulse via gates G52 and G53 to fire tube 7 of R14 to record a space, i. e. an incoming space is added to a mark already registered to record a space.

At 10 milliseconds, a gate G50 examines the condition of the incoming space lead L15 and if a space element is being received, a pulse is passed to a gate G57. If the space tube of flip-flop F15 is fired, gate G57 receives a second input and its output acts via gate G58 to fire F15 back to mark. Thus, at this time, F15 fired to mark indicates that a space has been added to a space.

At 11 milliseconds, a gate G56 examines the condition of F15 and if the space tube is still fired (indicating an incoming mark), a pulse is passed via gates G52 and G53 to fire tube 7 of R14. Thus, a mark incoming is added to a registered space to produce a space.

At 26, 46, 66, 86, 106 and 126 milliseconds, the foregoing cycle of events is repeated so that by 131 milliseconds there is set up on R14 a counter-check combination representing the addition of the original combination registered thereon and the received seven-element combination.

Referring back to Fig. 9, the number of combinations received is counted by a counting chain C17 which operates in the same manner as the counting chain C5 shown in Fig. 4. This counting chain is initially set with gap 0 fired by the operation of a key K2. After five combinations have been received, a flip-flop F14 (corresponding to flip-flop F4 in Fig. 4) is changed over to its "check" position by the firing of tube C. This extinguishes the "normal" tube N which in turn disables (inter alia) gates G45 and G46 so that the first five, seven-element code combinations stored on the multi-character register R12, are left undisturbed during the next cycle of operations. At the same time, the removal of a potential from lead L19 also disables (i. e. renders inoperative) gates G53 and G61 (Fig. 10). Nothing can now pass through the gate G53 to disturb the counter-check combination stored on R14; while the disabling of gate G61 means that no error pulse is passed to line L21 if the cross-check combination proves to have more or less than three spaces (which it may very well have without being necessarily incorrect).

The firing of the check tube C of F14 (Fig. 9) results in the application of an operating potential to lead L20 and so renders operative (inter alia) a gate G59 (Fig. 10) whose purpose will be apparent later.

In the next cycle of operations, the cross-check combination is received from the transmitter and is compared element by element with the counter-check combination set up on R14.

At 6 milliseconds, F15 is biassed to mark and at 7 milliseconds, it is brought back to space if tube 1 of R14 is fired, i. e. if the first element of the counter-check combination is a space.

At 8 milliseconds, the pattern on R14 is stepped so that tube 1 now records the second element of the cross-check combination while the first is still registered on F15.

There are two possibilities of error, viz: an incoming space coincides with a registered mark and an incoming mark coincides with a registered space. These two possibile conditions of error are examined separately at 9 and 11 milliseconds, respectively.

At 9 milliseconds, gate G51 opens if the first element of the received cross-check combination is a space (signified by a potential on lead L15), and if at the same time, the first element of the derived counter-check combination (as recorded by F15) is a mark, i. e. there is disagreement. If such is the case, an "error" pulse is passed via gates G51, G52 and G59 to lead L22. There is now no potential on lead L19 and so gate G58 is closed and nothing is set up on tube 7 of R14.

At 10 milliseconds, the condition of the incoming space lead is examined by gate G50 and if the first element of the received cross-check combination is a space, an input is supplied to gate G57. If tube S of flip-flop F15 is fired to indicate that the first element of the derived counter-check combination is also a space, i. e. there is agreement, then gate G57 passes a pulse through gate G58 to fire the mark tube of F15.

Thus, when at 11 milliseconds, gate G56 examines the condition of F15, the latter will be in the mark condition if an incoming space coincides with a space registered on F15. If, however, a space registered on F15 coincides with the absence of a space on L15, i. e. with an incoming mark, F15 will still be in the condition of the S tube fired and G56 passes an "error" pulse through gates G52 and G59 to lead L22.

Thus, a pulse on L22 either at 9 milliseconds or 11 milliseconds, indicates disagreement between the first element of the incoming check combination or the first element of the check combination derived at the receiver.

The remaining elements of the cross-check and counter-check combinations are similarly compared one at a time and any disagreements are signified by the application of an "error" pulse to lead L22.

For convenience in the description, it will first be assumed that the received cross-check combination agrees exactly with the derived counter-check combination so that no error pulses appear on lead L22.

At the end of this cycle, the discharge in the character counter C17 (Fig. 9) steps back to gap 0 and flip-flop F14 changes back to its normal condition with tube N fired. It has already been explained that when this tube is fired, it supplies an operating potential to various gates in Figs. 9 and 10 which are normally required to be operative. In addition, tube N supplies via lead L17, an operating potential to a gate G62 (Fig. 11).

Figure 11:
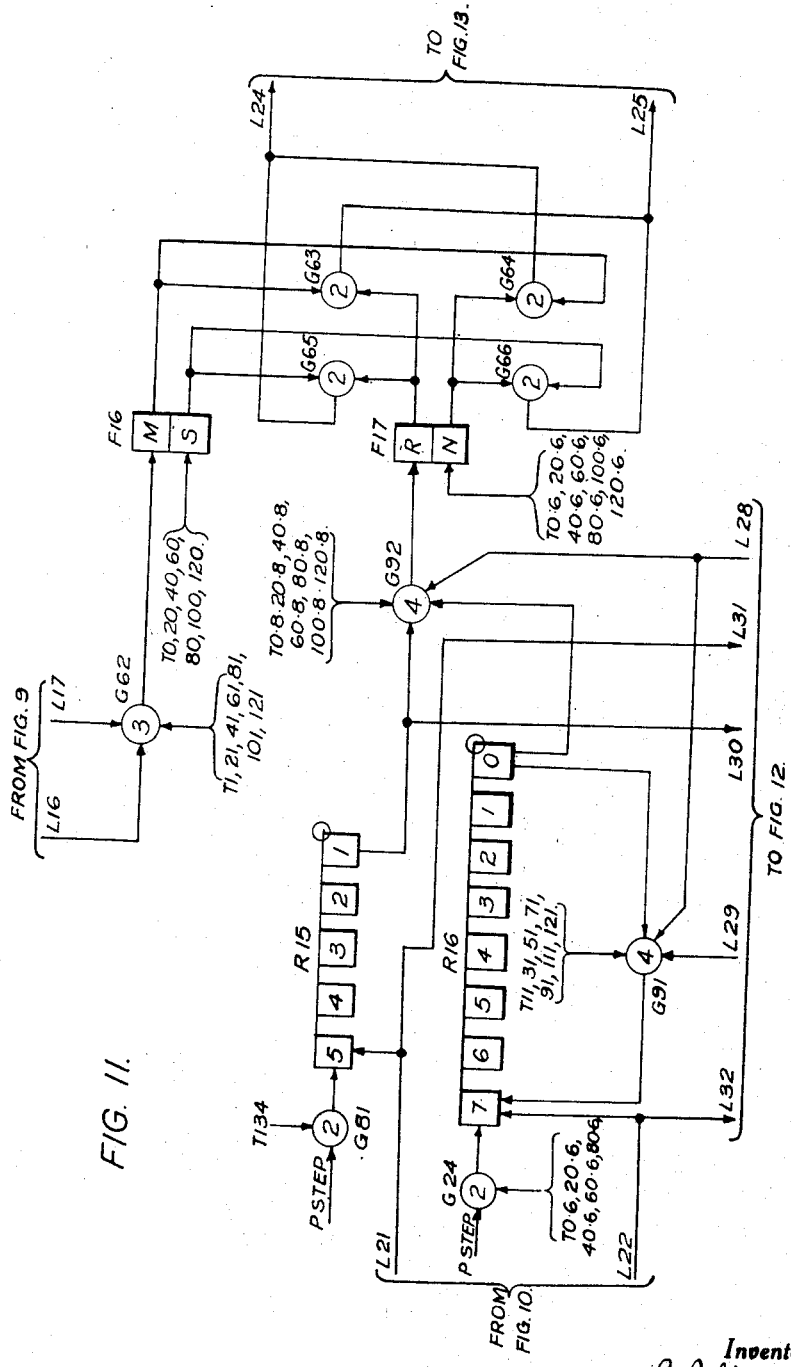

On the occurrence of the next synchronising pulse, i. e. at the commencement of the first of the next five, seven-element combinations, the time scale circuit of Fig. 9 is re-started and its first output pulse (shown for convenience as having time "0") fires, the space tube of a flip-flop F16 (Fig. 11).

At 1 millisecond, gate G62 examines the condition of lead L16 which is connected to tube 1 of the multi-character register R12 (Fig. 9). It is on this tube that the first element of the first combination of the first five, seven-unit code combinations is stored. If this element is a mark, tube 1 will be fired and F16 (Fig. 11) will be changed over to mark.

At 2 milliseconds, the pattern on the multi-character register R12 (Fig. 9) is stepped so that the second element of the first combination is now recorded by the condition of tube 1.

This second element, is read off at 21 milliseconds, and the remaining elements of the first five seven-element code combinations are similarly read off and registered successively on the flip-flop F16 (Fig. 11).

While the first five combinations are being stepped out of the multi-character register R12 (Fig. 9), the second set of five code combinations is stepped into it via gate G46.

If the mark tube of flip-flop F16 is fired, its output passes to two gates G63 and G64. Which of these gates opens is determined by the condition of a flip-flop F17. In the absence of an error, the normal tube N of F17 is fired so that gate G64 opens and a marking potential appears on lead L24.

Similarly, the output of the space tube of F16 passes to two gates G65 and G66, of which G66 is normally open and, if F16 is in the space condition, a spacing potential appears on lead L25.

Of the four possible combinations of the two prefix elements, three (M M, S M and S S) indicate that the remaining five elements of the seven-unit combination can be re-transmitted without change. The fourth combination of prefix elements (M S) indicates that a translation must take place. The nature of the prefix is determined by a three-stage, non-repeating counting chain C16 (Fig. 13) which may comprise, for example, three cold-cathode, gas-discharge gaps so connected that successive pulses applied via gate G67 cause a discharge initially present across gap N to transfer first to gap M and then to gap S.

At 10 milliseconds, i. e. in the middle of the first element of the prefix, the condition of the mark lead L24 is examined by gate G68 and if a potential is present indicating that the first element is a mark, a pulse is passed through gate G67 to step the discharge in C16 from gap N to gap M.

At 30 milliseconds, i. e. in the middle of the second element of the prefix, the condition of the space lead L25 is examined by a gate G69 and if the second element proves to be a space, another pulse is passed through gate G67 to step the discharge in C16. Thus, if the two elements of the prefix are M S, the discharge in C16 will step from gap N to gap S. If, on the other hand, the prefix is M M or S S, C16 will take only one step to gap M and if the prefix is S M the discharge will remain across gap N.

If the discharge is across gaps N or M signifying that no translation is necessary, then an input is supplied to open gate G70 which, in turn, controls gate G71 by which the condition of the last five elements is examined.

At 50 milliseconds, gate G71 is opened to give an output if the third element (i.e. the first element of the original five-unit combination) is a mark. This output is fed to tube 7 of a character register R11 which comprises a chain of five tubes interconnected to serve as a pattern-movement register. In this register it is preferred to record a mark by a fired tube and not a space; but, as already explained, by suitable adjustment of the circuit connections, either method of recording could be used. Thus, if the third element proves to be a mark, tube 7 of R11 is fired and, if a space, it is left extinguished.

Prior to the examination of the third element, i. e. at 40 milliseconds, gate G72 opens to pass a stepping pulse to step the pattern in R11 by one step to the right. Thus, if tube 7 was fired to represent a mark, tube 6 is fired and tube 7 extinguished. The third element is then registered on tube 7. The pattern is again stepped at 60 milliseconds. The remaining four elements of the combination are examined by means of gate G71 and the pattern on R11 is stepped after each examination by a pulse through gate G72.

At 130 milliseconds, the condition of the last element is examined and thus the last five elements of the seven-element combination are registered on R11 (from right to left). There they remain until the next code combination is received.

At 138 milliseconds, counter C16 is restored (if necessary) to its initial condition with gap N fired.

Upon receipt of the next code combination, the foregoing cycle is repeated and the last five elements of the new combination registered on R11.

8.8 milliseconds after the starting of the new cycle, the space tube SO of the output flip-flop F18 is fired and provides an output to the outgoing space lead L27, which latter may in turn energize one winding of a telegraph relay. This provides the start element of the re-transmitted signal combination retransmitted as a start-stop seven-element combination. What takes place thereafter is determined by the condition of the error-indicating flip-flop F23. As previously explained, it will first be assumed that the number of spaces was correct and that, therefore the "no-error" tube NE of F23 is fired.

At 29 milliseconds, the condition of tube 3 of the character register R11 is examined by gate G73, the operation of which is dependent upon the "no-error" tube being fired. If tube 3 of R11 is fired, meaning that the third element of the seven-element combination is a mark, then tube MO of the output flip-flop F18 is fired, a mark potential appears on lead L26 and the output relay (if any) changes over to mark for the first permutable element of the re-transmitted signal combination. At 40 milliseconds, the pattern on the character register R11 is stepped along by a pulse through gate G72. This means that the fourth element of the original seven-element combination is now registered on tube 3 of R11. At the same time, tube 7 of R11 is ready to record the third element of the next seven-element combination.

At 48.8 milliseconds, the space tube SO of the output flip-flop F18 is fired if it was extinguished and 0.2 millisecond later the mark tube MO is fired if gate G73 detects a mark for the second permutable element.

This continues until the start element and all five permutable elements have been re-transmitted, under the control of the output flip-flop F18.

At 128.8 milliseconds, the space tube SO of flip-flop F18 is fired and at 129 milliseconds the mark tube is fired via a gate G74. This provides the stop condition to conclude the teleprinter signal combination.

So far the case has been considered of the receipt of seven-element combinations having a prefix other than M S. When the last mentioned prefix is detected by counter C16, gap S thereof is fired. This means that gates G70 and G71 are disabled so that the remainder of the seven-element combination will not be registered on the character register R11. On the other hand, a gate G75 is opened to pulses at certain intervals provided a potential is simultaneously present on the space lead. The output of gate G75 passes to a ten-stage, non-repeating counting chain of discharge gaps C14. This counting chain consists of a multi-cathode tube similar to C11 or C12. Initially, a discharge is present across gap 0 and successive pulses from gate G75 cause the discharge to transfer from gap to gap from left to right.

If the third element of the received seven-element combination is a space, then pulses are applied to C14 at 50 and 52 milliseconds thus stepping the discharge from gap 0 to gap 2. If the fourth element is also a space, another stepping pulse will be applied at 70 milliseconds thus stepping the discharge to gap 3. This opens a gate G76 to a pulse applied at 136 milliseconds which thereby fires tube 3 of the character register R11. Thus, the combination registered on R11 (reading from right to left) is M S S S S. This combination is read off and transmitted as previously described.

If the last five elements of the seven-element combination are M M S S M, then C14 takes 8 steps (at 88, 90, 92, 106, 108, 110, 112 and 114 milliseconds) so that gap 8 is fired. This gap controls no gate since this combination corresponds to the all-space combination which will be transmitted automatically by SO of F18 in the absence of any bias to mark from gate G73.

In the following table, the last five elements needing translation are given in the first column, and the second column shows the total number of steps taken by C14. The third column indicates the gate (or gates) opened at 136 milliseconds under control of C14 and the last column shows the corresponding translated five-element combination (as read off R11 from right to left).

| Combination received | No. of pulses applied | Gate(s) opened | Translated combination |
|---|---|---|---|
| S M M S M | 7 (2+5) | All | M M M M M |
| S S M M M | 3 (2+1) | G76 | M S S S S |
| M M M S S | 9 (5+4) | G77 | S M S S S |
| M S S M M | 4 (1+3) | G78 | S S M S S |
| M S M M S | 5 (1+4) | G79 | S S S M S |
| M S M S M | 6 (1+5) | G80 | S S S S M |
| M M S S M | 8 (3+5) | None | S S S S S |

It will now be assumed, for the sake of example, that the space counter C18 of Fig. 10 detects a mistake in the number of spaces in the second received combination and that, accordingly, an error pulse is applied to lead L21 at 135 milliseconds in the second cycle of the time-scale circuit. This lead is connected to tube 5 of the space-error register R15 shown in Fig. 11.

At 134 milliseconds, in the next cycle i. e. during the receipt of the third code combination, a stepping pulse is passed via a gate G81 to step the pattern on R15 by one step to the right.

Similarly, at 134 milliseconds in the fourth and fifth cycles of the time-scale circuit, the pattern on R15 is stepped by two more steps to the right so that eventually the presence of an error in the second received combination is recorded by the firing of tube 2 of R15.

Lead L21 is also connected via lead L31 to a gate G82 (Fig. 12) which receives a second input from the normally fired tube N of a flip-flop F20. When the error pulse appears on lead L21 at 135 milliseconds in the second cycle of operations, it therefore passes through gate G82 to fire the "failure" tube F of a four-position trigger circuit F19 of which tube "N" is normally fired. The output of tube F of F19 supplies a gate G83 and at 136 milliseconds a pulse is passed through this gate to fire the "space-error" tube S of flip-flop F20.

It will further be assumed, for the sake of the present example, that the third element of the received cross-check combination fails to agree with the third element of the derived counter-check combination and that an error pulse is supplied to lead L22 at 49 milliseconds in the sixth cycle of operations of the time-scale circuit.

The error pulse on lead L22 fires tube 7 of the "check-error" register R16 (Fig. 11). At 60.6 milliseconds the pattern on R16 is stepped from left to right by a pulse through a gate G84 so that tube 6 is now fired.

At 80.6, 100.6, and 120.6 milliseconds, three more stepping pulses are passed to R16 and eventually tube 3 is left fired to record that the third element of the cross-check combination failed to check.

Lead L22 is also connected via lead L32 to a gate G85 (Fig. 12) which is open since its other input is taken from tube S of F20 which was fired as previously explained as a result of the indication of a faulty combination by the space counter. The error pulse from lead L32 is therefore effective to fire the "correction" tube C of trigger circuit F19. This takes place at 49 milliseconds in the sixth or "check-character" cycle of the time-scale circuit.

At 60 milliseconds in the same cycle, a pulse is applied to a gate G86 which pulse is passed via a gate G87 to re-fire the normal tube N of flip-flop F20.

At 132 milliseconds, a pulse is passed through a gate G88 to fire the normal tubes "N" of two flip-flops F21 and F22 if they are not already fired.

At 133 milliseconds, a gate G89 opens to fire the "correction" tube C of flip-flop F21 to agree with the firing of the correction tube C of the trigger circuit F19.

At 134 milliseconds, a gate G90 opens to re-fire the normal tube N of the trigger circuit F19.

In the next cycle of the time-scale circuit, the first of the five-combinations registered on the multi-character register R12 (Fig. 9) is read off and passed to the translation circuit of Fig. 13.

During the next cycle, R16 (Fig. 11) is given seven stepping pulses via gate G84 at 0.6, 20.6, 40.6 &c and 11, 31, 51 &c milliseconds i. e. approximately 11 milliseconds after each stepping, a four-input gate G91 examines the condition of tube 0. If tube 0 is fired, then gate G91 fires tube 7 so feeding the error indication back into the register. In the example being considered, tube 0 is fired after the pattern has been stepped at 40.6 milliseconds and tube 7 is fired to agree with it at 51 milliseconds.

The progress of the pattern on R16 during this cycle is shown by the following table in which only "significant" times are considered. In this table an unfired tube is signified by the letter "N" standing for "No-error" and a fired tube by "E" standing for "Error." The time "0" signifies the condition at the end of the previous cycle:

| Time in Milliseconds | Tubes of R16 | | | | | | | |
|---|---|---|---|---|---|---|---|---|
| | 7 | 6 | 5 | 4 | 3 | 2 | 1 | 0 |
| 0 | N | N | N | N | E | N | N | N |
| 0.6 | N | N | N | N | N | E | N | N |
| 20.6 | N | N | N | N | N | N | E | N |
| 40.6 | N | N | N | N | N | N | N | E |
| 51 | E | N | N | N | N | N | N | N |
| 60.6 | N | E | N | N | N | N | N | N |
| 80.6 | N | N | E | N | N | N | N | N |
| 100.6 | N | N | N | E | N | N | N | N |
| 120.6 | N | N | N | N | E | N | N | N |

It is pointed out that the condition obtaining at the end of the cycle is the same as that at the beginning, namely, tube 3 is fired to signify that the third element is faulty.

At 134 milliseconds in this cycle, a stepping pulse is passed via gate G81 (Fig. 11) to the space error register R15 so that tube 1 is now fired and supplies one input to a gate G92. The fired condition of tube 1 at this time indicates that an error was detected in the second combination, i. e. the combination that is to be transferred to the register R11 in the next cycle.

During the next cycle, the second received combination stored on the multi-character register R12 (Fig. 9) is read off lead L16 by gate G52.

Also during this cycle, stepping pulses pass via gate G84 to step the pattern on R16 in exactly the same manner as that given in the foregoing table of the preceding cycle. The time in the cycle at which tube 0 of R16 becomes fired is just before the transfer of the particular element in which an error has been detected.

After the stepping at 40.6 milliseconds, i. e. just before the third element of the second combination is read off by gate G62, tube 0 of R16 is fired and this provides another input to gate G92. A further input to this gate comes from the "correction" tube C of flip-flop F21 which, in this example, is fired.

At 40.8 milliseconds, gate G92 opens to fire the "reverse" tube R of flip-flop F17 which tube supplies one input each to gates G63 and G65. At the same time the extinguishing of the normal tube N of F15 disables gates G64 and G66.

At 41 milliseconds, the third element of the second combination is read off by gate G62 and flip-flop F16 is set accordingly. If this third element is read off as a mark, gate G63 opens to provide an output to the "space" lead L22. On the other hand if a space is read off then G65 opens to provide an output to the "mark" lead L22. Thus, whatever condition is read off for this third element of the second combination, the opposite condition is impressed upon leads L21 and L22.

At 60.6 milliseconds i. e. just before the fourth element of the second combination is read off by gate G62, the normal tube N of flip-flop F17 is re-fired so bringing back into operation gates G64 and G66 and disabling (by extinguishing tube R) gates G63 and G65.

Also at 60.6 milliseconds, the pattern on the check-error register R16 is stepped by a pulse through gate G84 so that tube C is extinguished. This disables gate G92 so that F17 is not changed over to the reverse condition at 60.8 milliseconds nor at any other time during this cycle.

Near the end of the cycle, at 134 milliseconds, the pattern on the space error register R15 is stepped off altogether, leaving all tubes unfired. Thus, although R16 supplies an input to gate G92 at 40.6 milliseconds in the next three cycles, i. e. during the reading off of the third, fourth and fifth combinations stored on R12, there is no input from R15 and F17 remains in its normal condition. Thus no further reversals are carried out by gates G63 and G65.

During the receipt of the next cross-check combination, i. e. after the first five combinations have been transmitted, the pattern on R16 is stepped out, while the new pattern (if any) is being stepped in.

It will thus be seen that if the space counter finds that one particular combination is wrong and the counter-check register finds that one particular element is wrong, then that element of that combination will be corrected before the combination is passed to the translation and output circuits.

The case will now be considered in which the space-counter C18 (Fig. 10) detects a faulty combination—say, the second, as before—but a comparison between the cross-check and counter-check combinations shows no discrepancy. All that can be done in this case is to indicate that this second combination has been wrongly received.

As before, the space-counter causes an error pulse to be passed via gate G61 to lead L21 at 135 milliseconds during the recording on R12 (Fig. 9) of the second code combination. Also as before, this error pulse acts via lead L31 and gate G82 (Fig. 12) to fire the "failure" tube F of the four-position trigger circuit F19. At 136 milliseconds, gate G83 causes the firing of tube S of flip-flop F20.

The error-pulse at 135 milliseconds is also passed via lead L21 to the space-error register R15 (Fig. 11) and towards the end of the third, fourth, and fifth combinations, the pattern on R15 is stepped so that tube 2 is eventually fired to record that the second combination is faulty.

At 132 milliseconds in the next cycle (that is, just after the cross-check and counter-check combinations have been compared), the normal tubes N of flip-flops F21 and F22 (Fig. 12) are fired (if not already fired) by a pulse through gate G88.

At 133 milliseconds, a gate G93 opens to fire the tube D of flip-flop F22.

In the next cycle, the first received combination is read off the multi-character register and passed unchanged to the translation circuit.

At 134 milliseconds in this next cycle (the seventh cycle if the first cycle is regarded as that in which the first combination was received and stored on the multi-character register), the pattern on R15 is stepped so that tube 1 is now fired.

At 3 milliseconds in the next (eighth) cycle, gate G94 (Fig. 12) receiving inputs from tube 1 of R15 (via lead L30) and tube D of F22 open to pass a pulse via lead L23 to fire the "error" tube E of flip-flop F23 (Fig. 13). This flip-flop was set in the "no-error" condition at 2 milliseconds, if not already there. The firing of the error tube E cause the extinguishing of the "no-error" tube NE and so closes gate G73. This means that the contents of the character register R11 will not be read off and transmitted so that F18 will stay in the space condition for the first 40 milliseconds. On the other hand, a gate G95 is opened to a pulse at 49 milliseconds. The effect of this pulse is to fire the mark tube MO of the output flip-flop F18 to send a mark for the second permutable element of the signal combination. The mark tube will not be fired again until the stop element so that the combination transmitted will be (Start) S M S S S (Stop). This is the combination corresponding to line feed so that the receiving teleprinter will feed the paper on the platen (assuming a page printer) by one line. This line feed coming at an intermediate point in a line of printing will immediately tell the recipient that an error has occurred.

At the end of this eighth cycle, the pattern on R15 (Fig. 11) is stepped out so that tube 1 is left unfired and gate G94 is disabled so that the remaining combinations are translated and retransmitted without any indications of error (assuming that they were correctly received).

If the counter-check register gives indication of a faulty element but the space counter gives no indication of a faulty combination, the assumption is made that all five code combinations were, in fact, received correctly and the counter-check report of disagreement is ignored. How this is achieved will now be explained.

Figure 12:
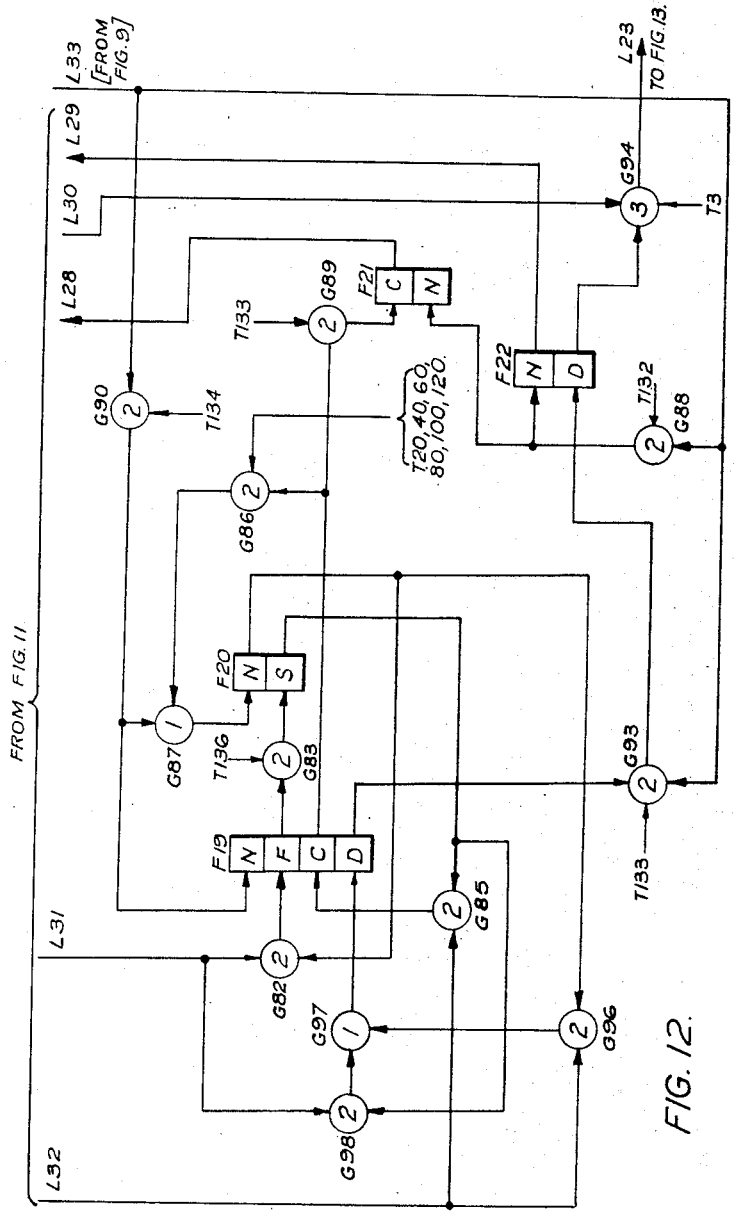

The error-pulse from the counter-check register passes via leads L22 and L32 to a gate G96 (Fig. 12). This gate receives a second input from the normally fired tube N of flip-flop F20 so that gate G96 opens to pass a pulse via a gate G97 to fire the "disagreement" tube D of the trigger circuit F19.

At 133 milliseconds, gate G93 opens to fire tube D of flip-flop F22 suplying gate G94.

At 3 milliseconds in the next cycle, gate G94 examines (via lead L30) the condition of tube 1 of the space-error register R15 (Fig. 11) but as (it has been assumed), no error pulses have been fed into the latter, gate G94 produces no output to lead L23 and no error indication is given.

It has already been explained that when an error pulse appears on lead L21 signifying that a faulty character combination has been detected, tube F of trigger circuit F19 is fired followed by tube S of F20, while at the same time, the number of the faulty combination is registered on R15. If now a second pulse appears on lead L21 to indicate that a second character is faulty, this information is registered on R15 and at the same time a gate G98 (Fig. 12) opens to pass, via gate G97, a pulse to fire tube D of F19. Thereafter any report of disagreement from the counter-check register is ignored but for each of the two suspected combinations "line feed" error indications are transmitted in the manner already described.

In the arrangements so far described, provision is made for inserting the cross-check combination after five character combinations; but it has already been pointed out that the transmitter circuit could be altered so that the cross-check combination was inserted after another number of character combinations.

Assuming that the receiver circuit must be prepared to receive a cross-check combination after a character combinations, it is necessary to provide that:

(a) The character counter C17 (Fig. 9) comprises a+1 gaps to count a character combinations and one cross-check combination.

(b) The multi-character register R12 comprises 7a tubes in order to register a seven-element character combinations, and (c) The space-error register R15 (Fig. 11) comprises a tubes to provide indication of a maximum possible number of a character combinations wrongly received.

It will be apparent that numerous other changes could be made in the system without departing from the invention. In particular, it is not necessary to use a code containing three spaces and four marks, since any other pre-determined proportion could be used. Furthermore, different proportions of marks and spaces could be used for different character combinations in the same group provided, of course, that an indication is given to the receiver, for example, by the prefix, of what proportion is to be expected.

While the principles of the invention have been described above in connection with specific embodiments and particular modifications thereof, it is to be clearly understood that this description is made by way of example and not as a limitation on the scope of the invention.

What I claim is:

1. Telegraph transmission error-detection system using only two signalling conditions (marks and spaces) comprising means at a transmitter for transmitting characters by code combinations, each combination having a predetermined number of mark and/or space elements, means for transmitting after each group of n character code combinations an additional cross-check combination, the repective elements of which depend upon the relation between the marks and spaces in the correspondingly positioned elements in the combinations of the preceding group, means at a receiver for receiving all said combinations, means for examining the received character combinations to detect an incorrectly received combination, means for examining said cross-check combination to detect the position of an incorrectly received element, and means operable upon the detection by said examining means of an incorrectly received combination and an incorrectly received element in the same group to correct said element in said combination.

2. Telegraph transmission error-detection system as claimed in claim 1, wherein said transmitting means comprises means for storing the first character combination of a group element by element as it is being transmitted and means for adding to the respective elements of the stored combination the correspondingly positioned elements of the remaining combinations in the group as they are being transmitted in order to yield said cross-check combination, the addition being performed in such manner that two successive like elements yield a resultant element of one kind and two successive unlike elements yield a resultant element of the opposite kind.

3. Telegraph transmission error-detection system as claimed in claim 2 wherein said transmitting means comprises a first chain of static electrical switches, means for recording the elements of said first combination successively upon the first switch in said chain and means for causing the pattern established on said chain by the conditions of the various switches to progress in steps along said chain during the transmission of said combination whereby said combination is ultimately registered by the pattern established on said chain.

4. Telegraph transmission error-detection system as claimed in claim 3 wherein said transmitting means further comprises a first two-condition device, means for registering by the successive conditions of said device the successive elements recorded on said chain of switches, a second two-condition device, means for successively registering on said second device the successive elements of a second character combination, means for examining simultaneously the conditions of said two devices so as to perform said addition and means for modifying the condition of the switch upon which the corresponding element of the cross-check combination is registered, in accordance with the result of said examination.

5. Telegraph transmission error-detection system as claimed in claim 4 wherein said transmitting means further comprises, means for receiving characters in the form of start-stop teleprinter code combinations and means for translating said combinations into corresponding error-indicating code combinations before transmission.

6. Telegraph transmission error-detection system as claimed in claim 4 further comprising means for registering on said second device the successive elements of a combination whilst the respective elements are being transmitted.

7. Telegraph transmission error-detection system as claimed in claim 1, wherein said examining means at said receiver comprises means for registering all the character combinations of a group element by element as they are received and for storing them until said cross-check combination has been received and examined.

8. Telegraph transmission error-detection system as claimed in claim 1 wherein said examining means at said receiver comprises a second chain of static electrical switches, means for recording the elements of one group of character combinations successively upon the first switch in said second chain and means for causing the pattern established on said chain by the conditions of the various switches to progress in steps along said chain during the receipt of the character combinations in said group whereby all said combinations are ultimately registered by the pattern established on said chain.

9. Telegraph transmission error-detection system as claimed in claim 1 wherein said examining means at said receiver comprises means for storing the first character combination of a group, element by element as it is being received, and means for adding to the respective elements of the stored combination the correspondingly positioned elements of the remaining combinations of the group as they are being received in order to yield a counter-check combination, the addition being performed in such manner that two successive like elements yield a resultant element of one kind and two successive unlike elements yield a resultant element of the opposite kind.

10. Telegraph transmission error-detection system as claimed in claim 8 wherein said examining means at said receiver further comprises, a third set of static electrical switches, means for recording the elements of said first received character combination successively upon the first switch in said third chain and means for causing the pattern established on said chain by the conditions of the various switches to progress in steps along said chain during the receipt of said combination whereby said combination is ultimately registered by the pattern established on said chain.

11. Telegraph transmission error-detection system as claimed in claim 10 wherein said examining means at said receiver further comprises a third two-condition device, means for registering by the successive conditions of said device the successive elements recorded on said third chain of switches, means for examining simultaneously the condition of said third device and of the incoming telegraph line while character combinations are being received thereon so as to perform said addition and means for modifying the condition of the switch upon which the corresponding element of the counter-check combination is registered in accordance with the result of said examination.

12. Telegraph transmission error-detection system as claimed in claim 11 wherein said modifying means comprises means for successively recording the successive elements of said counter-check combination on a two-condition device, means for examining simultaneously the condition of said last-mentioned device and of the incoming telegraph line while the cross-check combination is being received thereon and means for yielding an error potential when the result of said examination shows a difference between correspondingly positioned elements in the cross-check and counter-check combinations.

13. Telegraph transmission error-detection system as claimed in claim 12 in which the same device is used for said last mentioned device and said third device.

14. Telegraph transmission system as claimed in claim 12 wherein said examining means at said receiver comprises a gating device, means for providing one input potential to said gating device when an incorrectly received character combination is detected, means for supplying said error potential as another input to said gating device, means operating by said gating device to give an output potential only when said two input potentials are applied, and reversing means operable by said output potential to reverse the incorrectly received element.

15. Telegraph transmission system as claimed in claim 1, wherein said correction means at said receiver comprises means for receiving error-indicating character combinations and for translating them into corresponding start-stop teleprinter code combinations after any corrections have been carried out.

ESMOND PHILIP GOODWIN WRIGHT.

References Cited in the file of this patent

UNITED STATES PATENTS

| Number | Name | Date |
| --- | --- | --- |
| 2,552,629 | Hamming et al. | May 14, 1951 |
| 2,596,199 | Bennett | May 13, 1952 |

FOREIGN PATENTS

| Number | Country | Date |
| --- | --- | --- |
| 971,845 | France | Sept. 20, 1948 |